(12) United States Patent
Moore

(10) Patent No.: US 7,082,236 B1
(45) Date of Patent: Jul. 25, 2006

(54) FIBER-BASED DISPLAYS CONTAINING LENSES AND METHODS OF MAKING SAME

(76) Inventor: Chad Byron Moore, 7 W. 4th St., Corning, NY (US) 14830

( * ) Notice: Subject to any disclaimer, the term of this patent is extended or adjusted under 35 U.S.C. 154(b) by 0 days.

(21) Appl. No.: 09/517,353

(22) Filed: Mar. 2, 2000

Related U.S. Application Data

(63) Continuation-in-part of application No. 09/299,370, filed on Apr. 26, 1999, now Pat. No. 6,414,433, which is a continuation-in-part of application No. 08/810,960, filed on Feb. 27, 1997, now Pat. No. 5,984,747.

(51) Int. Cl.
*G02B 6/32* (2006.01)

(52) U.S. Cl. .............................. 385/33; 385/15; 385/31

(58) Field of Classification Search .................... 385/2, 385/8, 33, 40, 901; 359/619, 623; 350/96.15, 350/96.18, 96.19
See application file for complete search history.

(56) References Cited

U.S. PATENT DOCUMENTS

| | | | |
|---|---|---|---|
| 2,209,747 A | | 7/1940 | Eisler .......................... 178/6.5 |
| 3,521,941 A | | 7/1970 | Deb et al. .................... 350/160 |
| 3,767,392 A | | 10/1973 | Ota .................................. 96/1 |
| 3,924,931 A | * | 12/1975 | Cheo .......................... 350/160 |
| 3,964,050 A | | 6/1976 | Mayer ........................ 340/324 |
| 4,027,188 A | | 5/1977 | Bergman ..................... 313/220 |
| 4,038,577 A | | 7/1977 | Bode et al. ................. 313/188 |
| 4,099,082 A | * | 7/1978 | Chodil et al. ............... 313/358 |
| 4,126,854 A | | 11/1978 | Sheridon ..................... 340/373 |
| 4,183,125 A | * | 1/1980 | Meyer et al. ................... 445/24 |
| 4,554,537 A | | 11/1985 | Dick ............................ 340/775 |
| 4,559,564 A | * | 12/1985 | Itoh et al. .................... 358/482 |
| 4,717,949 A | | 1/1988 | Eichenlaub ..................... 358/3 |
| 4,728,864 A | | 3/1988 | Dick ........................ 315/169.3 |
| 4,833,463 A | | 5/1989 | Dick et al. ................... 340/775 |
| 4,896,149 A | | 1/1990 | Buzak et al. ................ 340/794 |
| 4,928,695 A | * | 5/1990 | Goldman et al. ............ 600/374 |
| 4,978,195 A | * | 12/1990 | Takano et al. ............... 385/116 |
| 5,009,483 A | * | 4/1991 | Rockwell, III ............... 385/116 |
| 5,016,963 A | * | 5/1991 | Pan .......................... 350/96.18 |
| 5,036,317 A | | 7/1991 | Buzak ......................... 340/783 |

(Continued)

FOREIGN PATENT DOCUMENTS

JP      10149763      2/1998

(Continued)

OTHER PUBLICATIONS

Dick, G. W. "Three-Electrode per PEL AC Plasma Display Panel", 1985 International Display Research Conf., pp. 45-50.

(Continued)

*Primary Examiner*—Jennifer Doan
(74) *Attorney, Agent, or Firm*—Brown & Michaels, PC

(57) ABSTRACT

The invention relates to an electronic display that combines the optical function of the display and part of the electronic function of the display into an array of individual fibers. The individual fibers contain a lens or optical function and at least one set of electrodes. Containing the lens function and the address electrode in the same fiber assures alignment of each pixel with its representative lens system and allows for the fabrication of very large three-dimensional, direct view displays. The electronic part of the displays can function as a plasma display (PDP), plasma addressed liquid crystal (PALC) display, field emission display (FED), cathode ray tube (CRT), electroluminescent (EL) display or any similar type of display.

42 Claims, 26 Drawing Sheets

U.S. PATENT DOCUMENTS

| | | | | |
|---|---|---|---|---|
| 5,077,553 | A | | 12/1991 | Buzak ......................... 340/794 |
| 5,086,297 | A | | 2/1992 | Mjyake et al. .............. 340/759 |
| 5,127,078 | A | * | 6/1992 | Terry et al. ................. 385/116 |
| 5,272,472 | A | | 12/1993 | Buzak .......................... 345/60 |
| 5,313,423 | A | | 5/1994 | Sato et al. .................. 365/200 |
| 5,440,201 | A | | 8/1995 | Martin et al. ............... 313/582 |
| 5,446,344 | A | | 8/1995 | Kanazawa ............... 315/169.4 |
| 5,457,574 | A | | 10/1995 | Eichenlaub ................. 359/619 |
| 5,661,500 | A | | 8/1997 | Shinoda et al. .............. 345/60 |
| 5,674,553 | A | | 10/1997 | Shinoda et al. ............... 427/68 |
| 5,729,645 | A | * | 3/1998 | Garito et al. ............... 385/127 |
| 5,739,801 | A | | 4/1998 | Sheridon .................... 345/84 |
| 5,745,086 | A | | 4/1998 | Weber ......................... 345/63 |
| 5,748,825 | A | * | 5/1998 | Rockwell, III .............. 385/126 |
| 5,790,086 | A | * | 8/1998 | Zelitt ........................... 345/32 |
| 5,838,494 | A | * | 11/1998 | Araki .......................... 359/455 |
| 5,961,804 | A | | 10/1999 | Jacobson et al. ........... 204/606 |
| 5,984,747 | A | * | 11/1999 | Bhagavatula et al. ......... 445/24 |
| 6,236,799 | B1 | * | 5/2001 | Huh et al. ................... 385/147 |
| 6,247,987 | B1 | * | 6/2001 | Moore ......................... 445/24 |
| 6,414,433 | B1 | * | 7/2002 | Moore ........................ 313/582 |
| 6,452,332 | B1 | * | 9/2002 | Moore ........................ 313/582 |

FOREIGN PATENT DOCUMENTS

JP          11003649          6/1999

OTHER PUBLICATIONS

Mayer, W. 1972, "Tubular AC Plasma Panels", IEEE Conf. Display Devices, Conf. Rec., New York, pp. 15-18.

Storm, R., 1974, "32-Inch Graphic Plasma Display Module", SID Int. Symposium, San Diego, pp. 122-123.

Moore, C. et al, "Fiber Plasma Display", SID '97 Digest, pp. 1055-1058.

Trotter, D. M. et al, "PALC Displays Made From Electroded Glass Fiber Arrays", SID '97 Digest, pp. 379-382.

Weber et al, 1996, "Materials and Manufacturing Issues of Color Plasma Displays", MRS Bulletin, 65, 1996.

Mikoshiba, Shigeo, SID Int. Symp. Seminar Lectaure Notes, M-4, 1998.

Koiwa et al, 1995, Preparation of MgO Protective Layer for AC-Type Plasma Display Panel by Means of Screen-Printing; J. Electrochem. Soc., vol. 142, No. 5, pp. 1396-1401.

Koiwa et al, 1996, MgO Powders for Protective Layer of Alternating Current Plasma Display Panel, Electronics and Communications in Japan, Part 2, vol. 79, No. 4, pp. 55-66.

Koiwa, I., 1996, "A Study on MgO pOwder and MgO Liquid Binder in the Screen-Printed Protective Layer for AC-PDPs" IEICE Trans. Electron. vol. E79-C, No. 4, pp. 580-585.

* cited by examiner

FIBER-BASED DISPLAYS CONTAINING LENSES AND METHODS OF MAKING SAME

REFERENCE TO RELATED APPLICATIONS

The present application is a continuation-in-part of U.S. patent application Ser. No. 09/299,370, filed on Apr. 26, 1999, entitled "FIBER-BASED PLASMA DISPLAYS", now U.S. Pat. No. 6,414,433 which is a Continuation in Part of U.S. patent application Ser. No. 08/810,960, filed on Feb. 27, 1997, now U.S. Pat. No. 5,984,747, the disclosures of which are incorporated herein by reference.

FIELD OF THE INVENTION

The invention pertains to fiber-based displays with built-in lenses and their methods of manufacture. More particularly, the invention pertains to three-dimensional and multiple view displays, and fabricating such displays using fibers.

BACKGROUND OF THE INVENTION

All electronic display technologies are composed of a large array of display picture elements, called pixels, arranged in a two-dimensional matrix. Color is added to these displays by subdividing each pixel element into three-color subpixels. The electronic display technologies can be further divided into a category known as flat-panel displays. The basic structure of a flat-panel display comprises two glass plates with a conductor pattern of electrodes on the inner surfaces of each plate with additional structure to separate the plates or create a channel. The conductors are configured in a x-y matrix with horizontal and vertical electrodes deposited at right angles from each other to allow for matrix addressing. Examples of flat-panel displays include plasma displays, plasma addressed liquid crystal (PALC) displays, field emission displays (FED), and the like.

Almost all flat-panel three-dimensional or multiple view displays are constructed by aligning a lens array or an array of slits to a preexisting display system.

U.S. Pat. Nos. 2,209,747, 4,717,949, 5,457,574, and 5,838,494 disclose stereoscopic display devices with an array of thin, vertical, parallel, equidistant, light emitting elements formed as lines behind a flat, transmissive, electronically controlled display panel, such as a cathode ray tube (CRT) or a liquid crystal display (LCD), generating the perception of three-dimensional images for an observer. The displays realize stereoscopic viewing without using any ancillary equipment, such as spectacles, that direct optical images of different polarized light components to the right and left eyes, respectively.

U.S. Pat. Nos. 2,209,747 and 4,717,949 disclose placing an opaque screen with a plurality of transparent slits in front of another screen, which displays a stereoscopic pair of images made up of alternating strips. Each strip displays a thin vertical section of one of the stereo pair of images. The strips are arranged so that the first strip displays a section of the right eye image, the second strip displays a section of the left eye image, the third strip displays a section of the right eye image and so on. The screen with the transparent slits is placed at a fixed distance in front of a picture so that an observer sees only the right eye strips through the slits with his right eye and only the left eye strips through the slits with his left eye. This technique of displaying stereographic pictures is known as the Hess system. For good image fidelity, the slits have to be very thin, relative to the opaque area that separates the slits, in order to block a large fraction of the light coming from the display. This makes it difficult to obtain bright images.

U.S. Pat. Nos. 5,457,574 and 5,838,494 disclose a three-dimensional display apparatus using a lenticular lens sheet. Referring to FIG. 1, observation positions R and L correspond to the view points of the right and left eyes. A lenticular lens sheet 40 contains an array of lenticular lenses where each lens has the same radius of curvature and a lens effect in one direction aligned to the electronic display 45 on which linear images are formed. On the electronic display 45, linear images which are obtained by dividing two images having parallax are formed based on the different, right and left view points, along the longitudinal direction of the respective lenticular lenses of the lenticular lens sheet 40. More specifically, alternating images 45a and 45b spaced on the lenticular lens spacing form the two parallax images viewed at points R and L.

Another method of generating a three-dimensional image without using glass is disclosed in U.S. Pat. No. 5,790,086. The patent is drawn to a device for creating a three-dimensional image by varying the distance of the image from the viewer pixel by individual pixel. The invention employs an array of extremely small, specially designed light-refracting optical elements which are formed such that the focal length of the elements varies across the surface of the optical element. By minutely displacing the entry point at which light is input to these optics for different pixels within an image, a complete image is presented to the viewer. The image contains certain elements which appear closer to the viewer while other elements appear farther from the viewer, mimicking the view of a real-world scene.

Prior art techniques for generating a three-dimensional image or multiple view image required a difficult alignment of either the lens array sheet or a sheet with an array of slits to the electronic display. Fabricating large lens arrays with tight tolerances have been difficult and fabricating large flat panel displays has been next to impossible.

Plasma display panels (PDP) are presently being constructed using the three electrode surface discharge structure, as disclosed in U.S. Pat. No. 4,833,463 and U.S. Pat. No. 5,661,500. FIG. 2 illustrates the basic structure of a surface discharge AC plasma display made using standard technology. The PDP can be broken down into two parts, a top plate 10 and a bottom plate 20. The top plate 10 has rows of paired electrodes referred to as the sustain electrodes 11a and 11b. The sustain electrodes are composed of wide transparent indium tin oxide (ITO) electrodes 12 and narrow Cr/Cu/Cr bus electrodes 13. The sustain electrodes 11 are covered with a thick (25 μm) dielectric layer 14 so that they are not exposed to the plasma. A magnesium oxide layer (MgO) 15 is deposited over the dielectric layer to enhance secondary emission of electrons and to improve display efficiency. The bottom plate 20 has columns of address electrodes 21 with barrier ribs 22 formed between them. Alternating red 23R, green 23G, and blue 23B phosphors are deposited into the channels between the barrier ribs 22 to provide color for the display. The top and bottom plates are frit sealed together and the panel is evacuated and backfilled with a gas mixture containing xenon gas.

The basic operation of the plasma display requires a plasma discharge whereby the ionized xenon generates ultraviolet (UV) radiation. This UV light is absorbed by the phosphor and converted into visible light. To address a pixel in the display, an AC voltage which is large enough to sustain a plasma but not large enough to ignite one is applied across the sustain electrodes 11. A plasma is analogous to a transistor in that, as the voltage is increased, nothing happens until a specific voltage is reached, at which point it turns on and current flows. Then an additional short voltage pulse is applied to the address electrode 21, which adds to the sustain voltage and ignites the plasma by adding to the total local electric field, thereby breaking down the gas into a plasma. Once the plasma is formed, electrons are pulled out of the plasma and deposited on the MgO layer 15. These electrons are used to ignite the plasma in the next phase of the AC sustain electrodes. To turn the pixel off, an opposite voltage must be applied to the address electrode 21 to drain the electrons from the MgO layer 15. At that point, there is no priming charge left to ignite the plasma in the next AC voltage cycle on the sustain electrodes. Using these priming electrons, each pixel can be systematically turned on or off. To achieve gray levels in a plasma display, each video frame is divided into 8 bits (256 levels) and, depending on the specific gray level, the pixels are turned on during these times.

U.S. Pat. No. 4,896,149 discloses and demonstrates the use of plasma channels to address a liquid crystal display. The PALC display, illustrated in FIG. 3, relies on the highly non-linear electrical behavior of a relatively low-pressure (10–100 Torr) gas, usually helium, confined in many parallel channels. A pair of parallel plasma address electrodes 36 are deposited in each of the plasma channels 35, and a very thin glass microsheet 33 forms the top of the channels. The plasma channels 35 are defined by barrier ribs 34. A liquid crystal layer 32 on top of the microsheet 33 is the optically active portion of the display. A cover sheet 30 with transparent conducting address electrodes 31 running perpendicular to the plasma channels 35 lies on top of the liquid crystal 32. Conventional polarizers, color filters, and backlights, such as those found in other liquid crystal displays, are also commonly used.

SUMMARY OF THE INVENTION

The present invention relates to forming a three-dimensional display using glass fibers with wire electrodes where the fibers have a lens function built into them to create the three-dimensional image. The three-dimensional image is created using a lenticular shaped fiber that provides a left and right eye image or a stereoscopic view. The lenticular shaped fibers also form multiple views across the viewing zone in front of the display. A lens shaped fiber with wire electrodes is also used to form a three-dimensional view where the image is created by varying the distance of the image from the viewer pixel by individual pixel. This three-dimensional image is created by dynamically changing the focus of the light generated by the display at each pixel location. The lenses which generate the three-dimensional images are preferably standard concave and convex lenses, a combination of both concave and convex lenses, or a Fresnel lens. The lens can also be contained within the fiber by using a high and low index of refraction material to form the fiber. The electronic part of the displays preferably function as plasma displays (PDP), plasma addressed liquid crystal (PALC) displays, field emission displays (FED), cathode ray tubes (CRT), electroluminescent (EL) displays or any similar type of displays.

The invention combines the optical function and part of the electronic function of the display into an array of individual fibers. The individual fibers contain the lens or optical function and at least one set of electrodes. By containing the lens function and the address electrode in the same fiber, alignment of each pixel with its representative lens system is assured. This technology allows for the fabrication of very large three-dimensional, direct view displays.

Another aspect of the invention involves creating a multiple view or stereoscopic display by using slits or an aperture in the fiber and several light generation regions. The method of forming the different views in this fiber-based display is created by a line of sight between the viewer and the generated light with respect to the aperture.

It is a primary object of the present invention to create a three-dimensional display where the image is created by dynamically varying the distance of the image from the viewer pixel by individual pixel. The resolution of the depth of the image is increased by applying the address voltage to more than one address electrode in at least one pixel location within the display.

The invention also includes a method of creating a three-dimensional image by dramatically varying the distance of the image from the viewer pixel by individual pixel. The resolution of the depth of the image is increased by applying the address voltage to more than one address electrode in at least one pixel location within the display.

It is another object of the present invention to create an electronic display having at least one fiber that contains at least one wire electrode with a lens function designed into part of the fiber.

It is a further object of the present invention to create an electronic display with a lens function used to change the direction of the light passing through a fiber.

It is a further object of the present invention to create an electronic display with a lens function used to create a three-dimensional display.

It is a further object of the present invention to use a co-extrusion process to form preforms comprising of two or more different materials and then draw those preforms into fibers.

DESCRIPTION OF THE PREFERRED EMBODIMENT

Since most of the lens arrays are linear arrays of lenses, such as a lenticular lens array, and most electronic displays are linear arrays of image elements, it is an object of this invention to combine these two functions into an array of individual fibers. The individual fibers contain the lens or optical function and at least one set of electrodes. Containing the lens function and the address electrode in the same fiber assures alignment of each pixel with its representative lens system.

Plasma and plasma addressed liquid crystal displays are the primary focus of most of the following embodiments, however, the disclosure is applicable to field emission displays (FED), cathode ray tubes (CRT), electroluminescent (EL) displays or any type of similar display.

Figure 1:
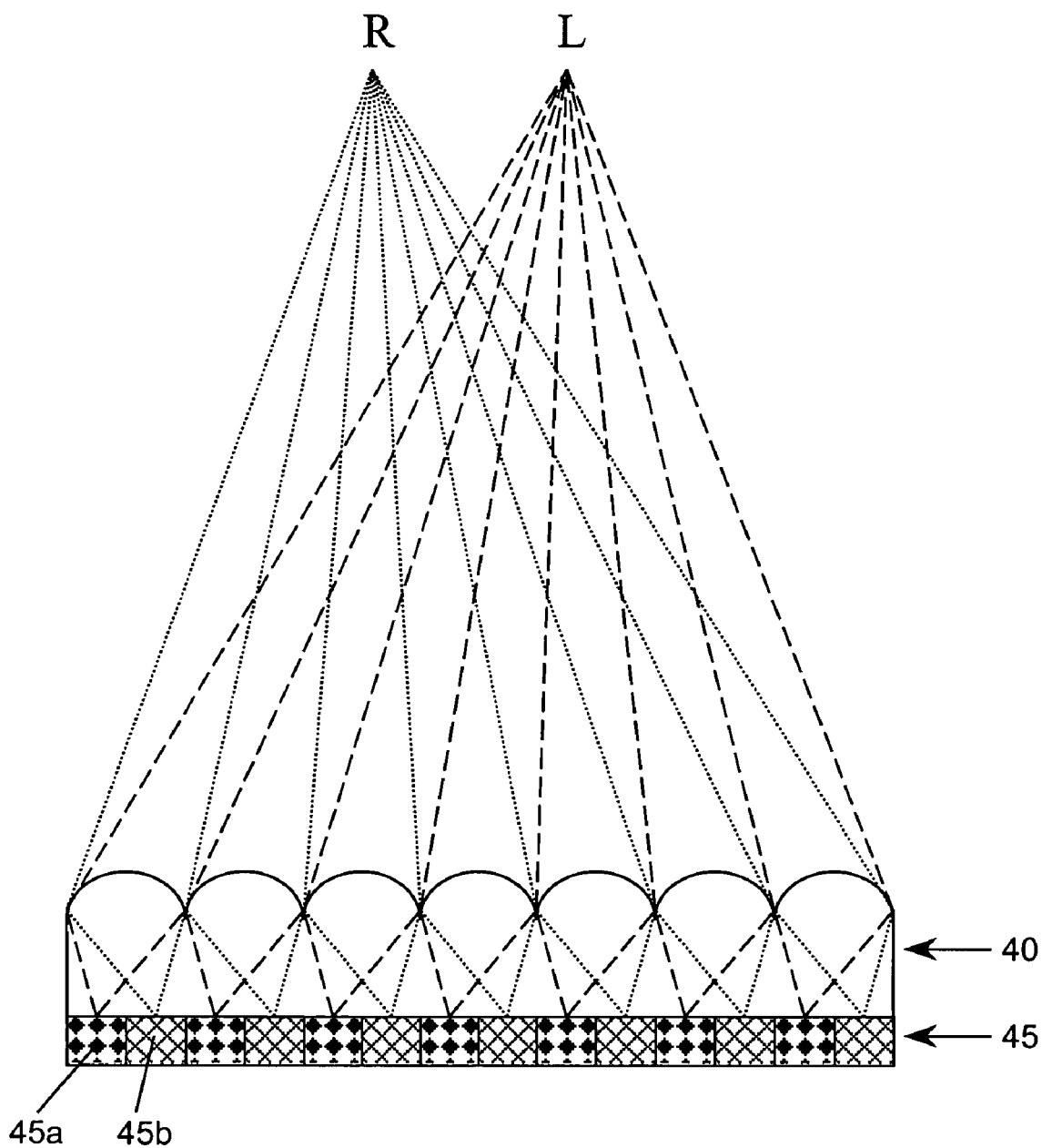
FIG. 1 shows a schematic view of stereoscopic viewing in a three-dimensional display apparatus using a lenticular lens sheet in accordance with the prior art.
Figure 2:
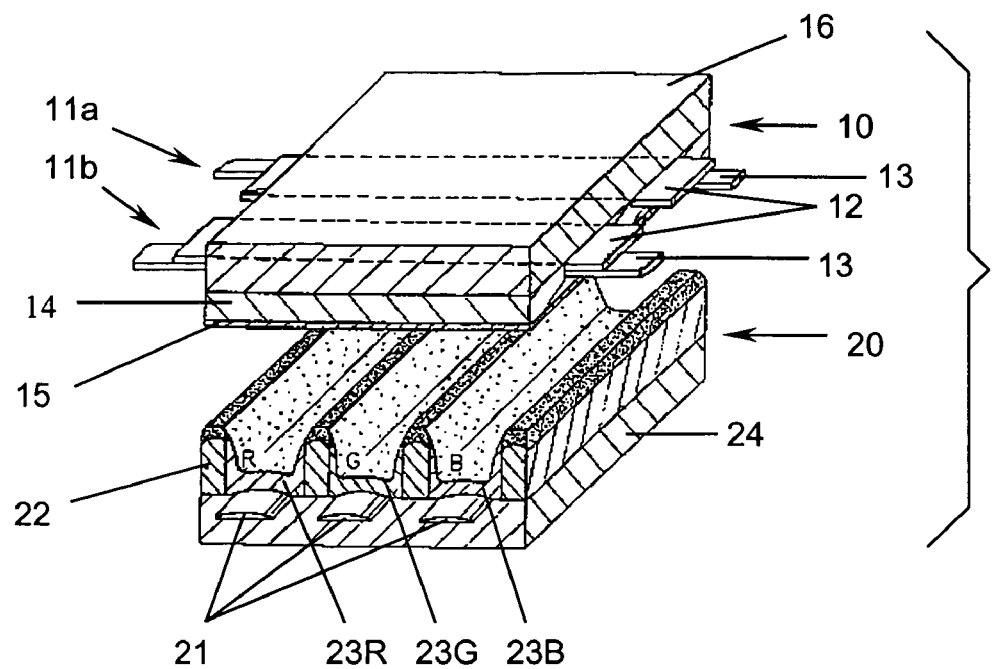
FIG. 2 illustrates a standard plasma display in accordance with the prior art.
Figure 3:
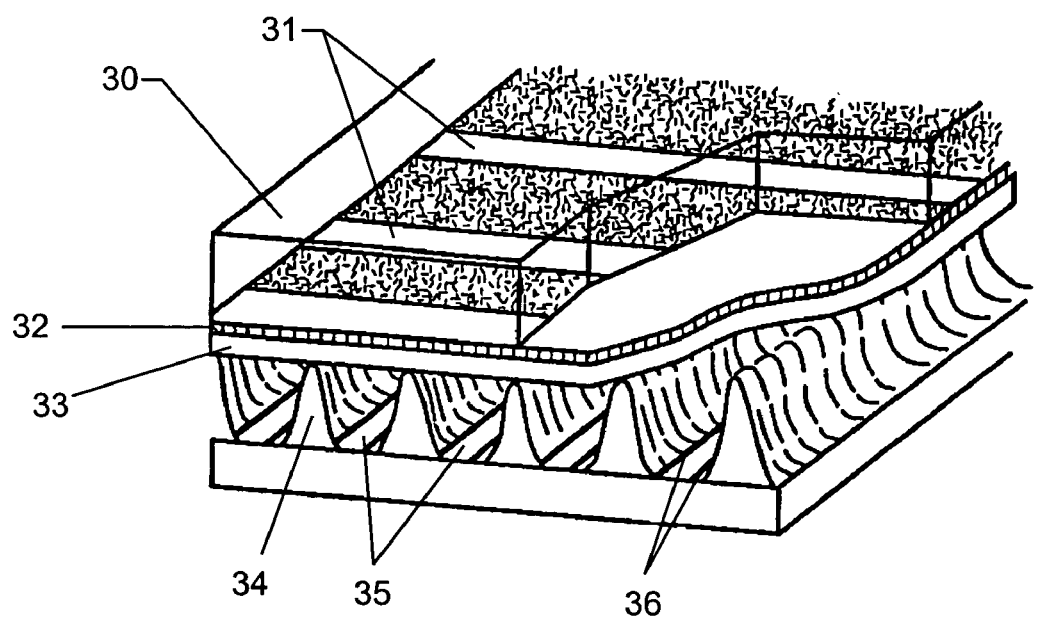
FIG. 3 illustrates a standard PALC display in accordance with the prior art.
Figure 4:
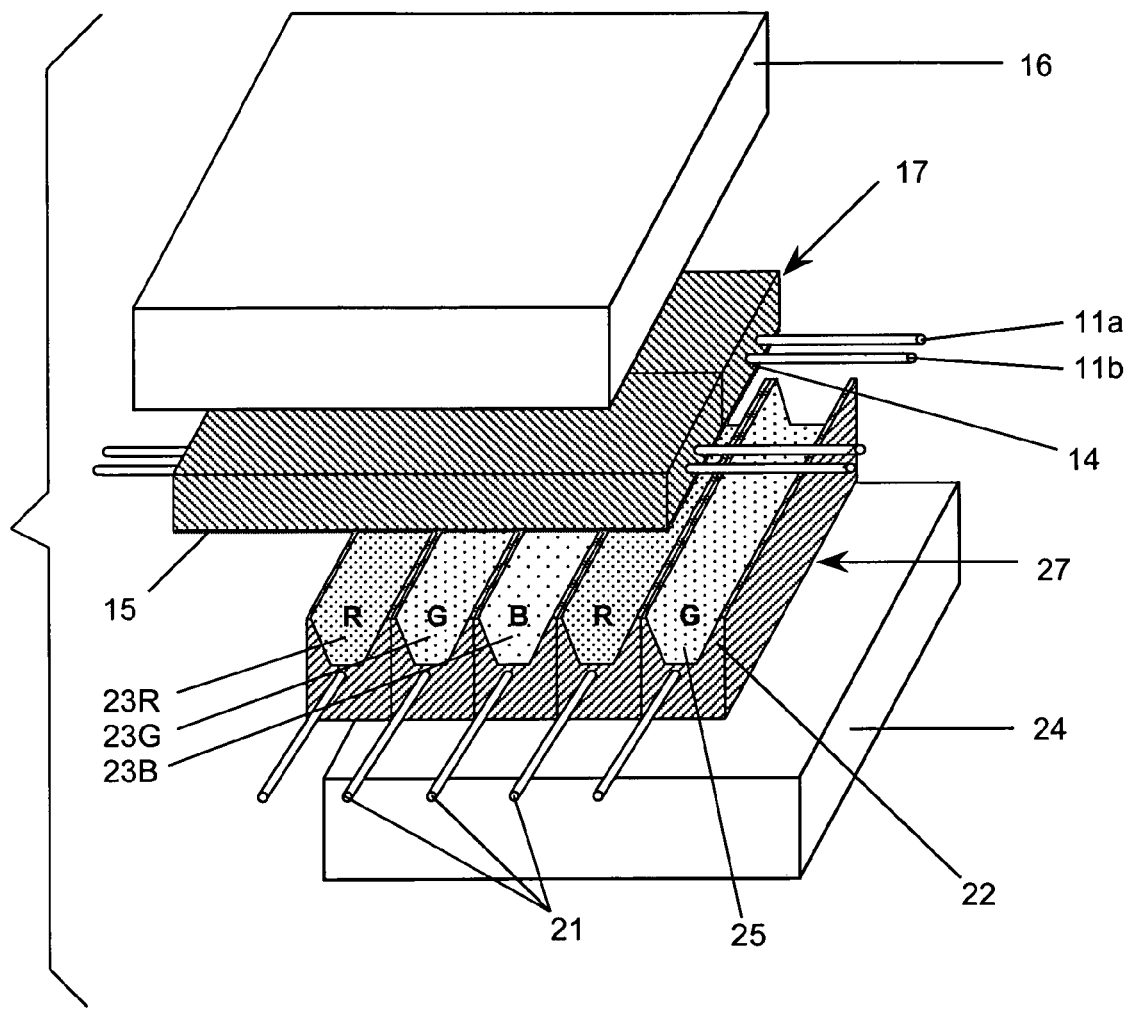
FIG. 4 schematically shows the fiber-based plasma display with all functions of the display integrated into fibers with embedded wire electrodes.

An issued U.S. Pat. No. 5,984,747, the disclosure of which is incorporated herein by reference and co-pending U.S. patent application Ser. No. 09/299,370, the disclosure of which also is incorporated herein by reference, each teach a plasma display structure using arrays of fibers. One innovation of the fiber-based display is that the entire functionality of the standard plasma display (FIG. 2) is created by replacing the top plate 110 and bottom plate 20 with respective sheets of top 17 and bottom 27 fibers (FIG. 4) sandwiched between plates of soda lime glass 16 and 24. Each row of the bottom plate is composed of a single fiber 27 that includes the address electrode 21, barrier ribs 22, plasma channel 25 and the phosphor layer 23. Each column of the top plate is composed of a single fiber 17 that includes two sustain electrodes 11, and a thin built-in dielectric layer 14 over the electrodes which is covered with a MgO layer 15. All of the glass fibers are formed using a fiber draw process similar to that used to produce an optical fiber in the telecommunications industry. The glass fiber is drawn from a large glass preform, which is formed using hot glass extrusion. Metal wire electrodes are fed through a hole in the glass preform and are co-drawn with the glass fiber. The glass around the metal wire is only drawn down enough to pull the wire and does not actually fuse to the wire. The phosphor layers are subsequently sprayed into the channels of the bottom fibers and a thin MgO coating is applied to the top fibers. Therefore, the entire function of the display is contained within the fibers. Sheets of top 17 and bottom 27 fibers are placed between two glass plates 16 and 24 and the ends of the glass fibers are removed from the wire electrodes. The glass plates are frit sealed together with the wire electrodes extending through the frit seal. The panel is evacuated and backfilled with a xenon-containing gas and the wire electrodes are connected to the drive circuitry.

Figure 5:
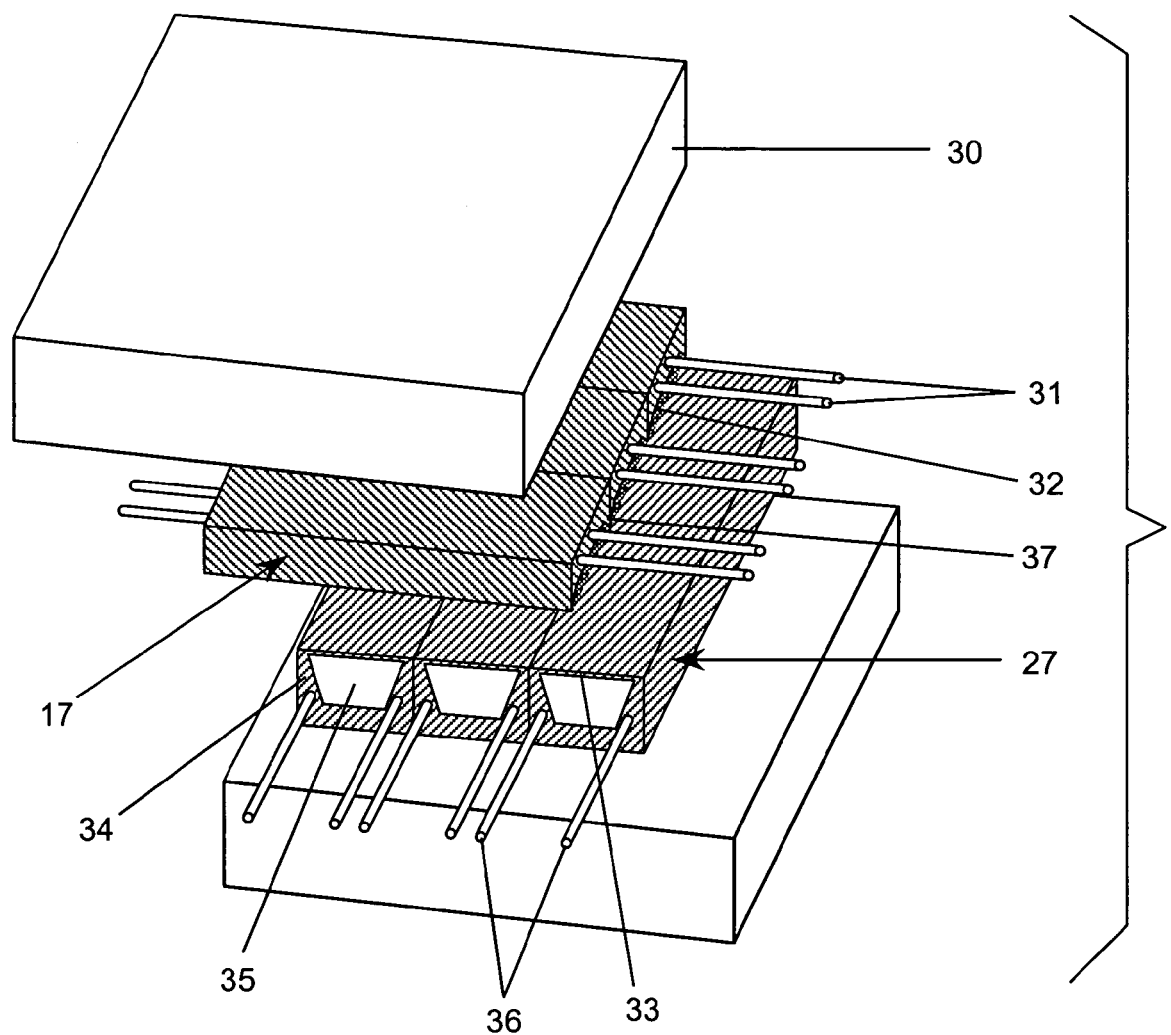
FIG. 5 schematically shows the fiber-based PALC display with all functions of the display integrated into the fibers with embedded wire electrodes.

A new PALC display structure using arrays of fibers has been disclosed in U.S. Pat. No. 5,984,747. In the fiber-based PALC display (FIG. 5) the top and bottom plates are replaced with arrays of top 17 and bottom 27 fiber arrays. Each row of the bottom plate is composed of a single hollow fiber 27 that contains the very thin glass microsheet layer 33, the barrier ribs 34, the parallel plasma address electrodes 36 and the plasma channel 35. Each column of the top plate is replaced with a single fiber that contains the address electrodes 31 and small built in spacers 37 for the liquid crystal layer 32. The top fibers 17 are colored to add color to the displays. The polarizers and liquid crystal alignment layers are added directly to the fibers.

During the basic operation of the PALC display, a voltage is applied to the address electrodes 31 to pull charge from the plasma channel and store it on the inside surface of the microsheet. Because there is no ground plane, when voltages are applied to the address electrodes 31, the voltages are divided among the liquid crystal 32, the microsheet 33, the plasma channel 35, and any other insulators intervening between the address electrode 31 and whatever element becomes the virtual ground. As a practical matter, this means that if there is no plasma in the plasma channel 35, the voltage drop across the liquid crystal 32 is negligible, and the pixels defined by the crossings of the transparent electrodes 31 and the plasma channels 35 do not switch. If, however, a voltage difference sufficient to ionize the gas is first applied between the pair of plasma electrodes 36 in a plasma channel 35, a plasma forms in the plasma channel 35 so that it becomes conducting, and constitutes a ground plane. Consequently, for pixels atop this channel, the voltages are divided only between the liquid crystal 32 and the microsheet 33. This places a substantial voltage across the liquid crystal 32 and causes the pixel to switch. Therefore, a plasma is ignited in the channel, which causes the row above the channel to be selected. Because the gas in the channels is non-conducting, the rows are extremely well isolated from the column voltages unless selected. This high nonlinearity allows very large numbers of rows to be addressed without loss of contrast.

Figure 6:
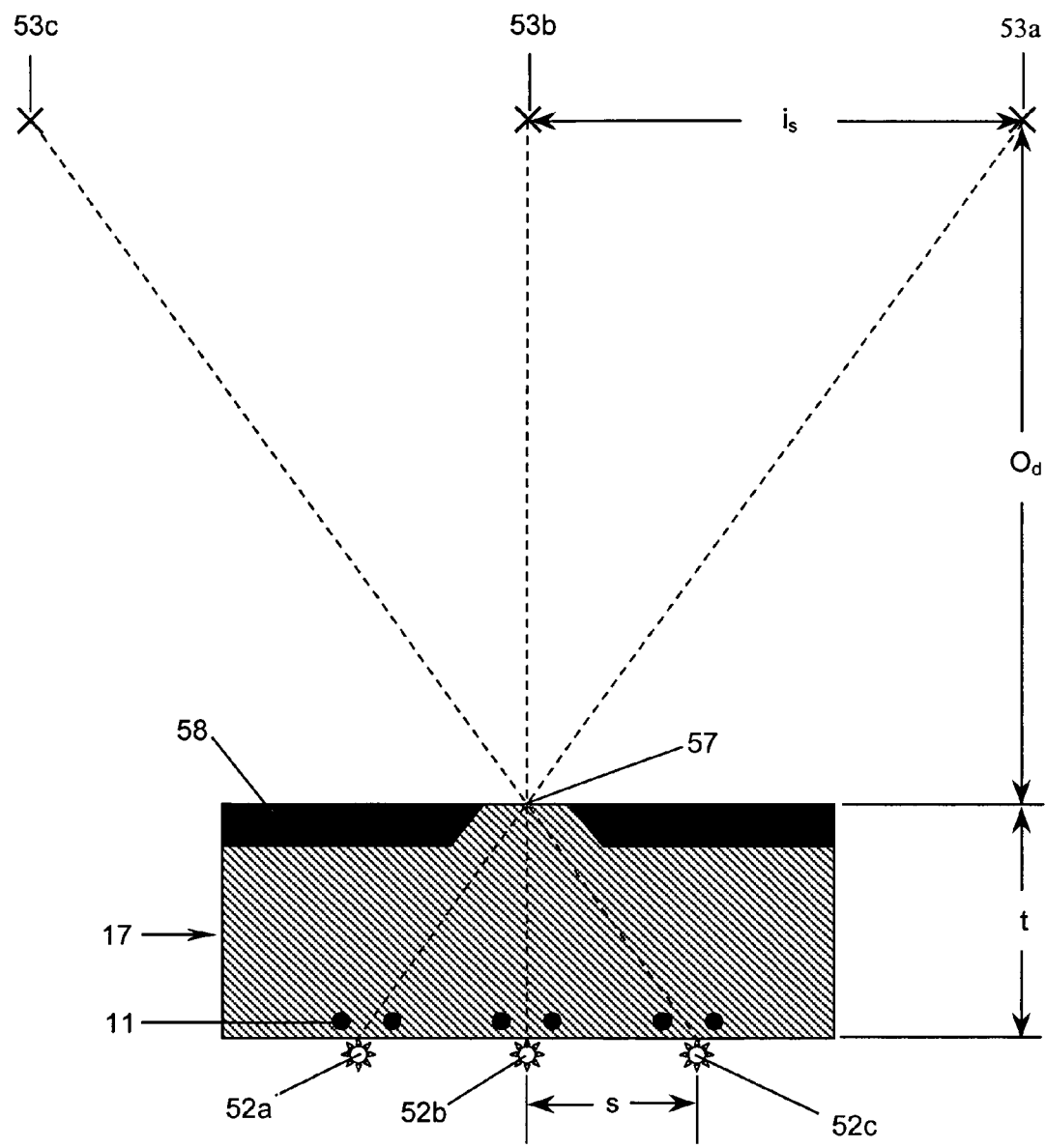
FIG. 6 shows a cross-sectional schematic of a fiber with absorbing regions, which form a small slit that is used to form multiple views from multiple light generated regions.

FIG. 6 illustrates the use of a fiber 17 with absorbing regions 58 to form a small slit aperture 57 that is used to form multiple views 53a, 53b, and 53c, when using multiple light generation regions 52a, 52b, 52c. The multiple views are used to create a stereoscopic display where each eye is placed in separate viewing zones (53a, 53b, or 53c) and right and left eye images are written to the corresponding light generation regions (52a, 52b, or 52c). Only two of the images 53 and light generation regions 52 are needed to form a stereoscopic image. The images 53 are created by addressing the particular electrodes 11 in the fiber to create a plasma, which in turn generates the light 52 for the image in the display. Assuming the light 52 is generated close to the fiber 17, the image is related to the fiber shape by the equation:

$$s/t = i_s/O_d$$

where s is the separation between light generation points (52a, 52b, 52c), t is the thickness of the fiber 17, $i_s$ is the image 53 separation distance, and $O_d$ is the distance the viewer is from the screen.

Figure 7:
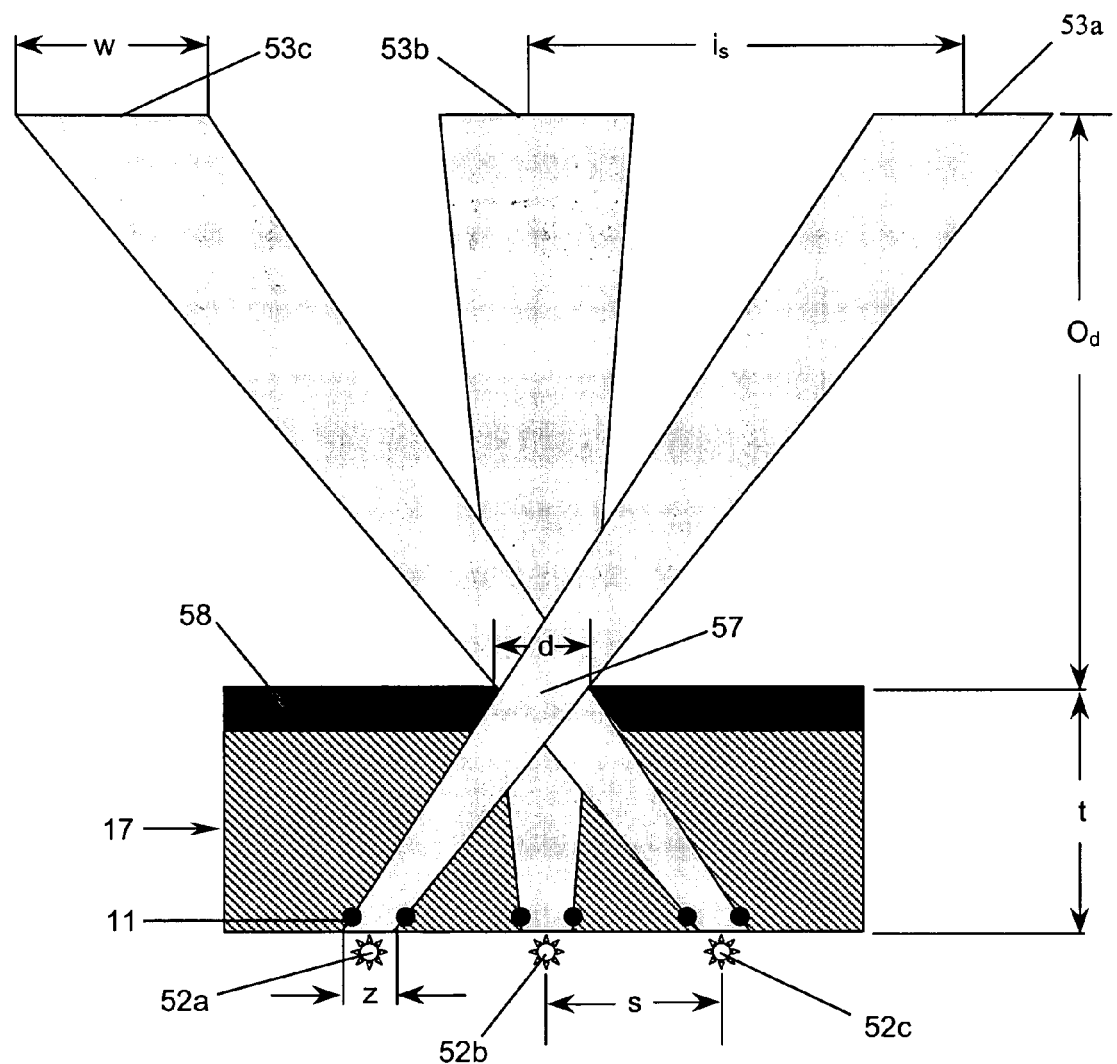
FIG. 7 shows a cross-sectional schematic of the width of the light generated regions from the fiber in FIG. 6.

FIG. 7 shows the width w of the viewing zone from the top fiber 17 with the three sets of sustain electrodes 11. The width w of the viewing zone assumes that the light is generated only between the sustain electrodes 11 in the zone labeled z. In a typical plasma discharge, the ionized gas forms a Gaussian distribution of light intensity extending out from the sustain electrodes 11. Assuming the light is confined between the sustain electrodes, the width of the viewing zone, w, is:

$$w = d + (d-z)O_d/t$$

where d is the opening of the aperture 57 and z is the separation of the sustain electrodes 11.

Figure 8:
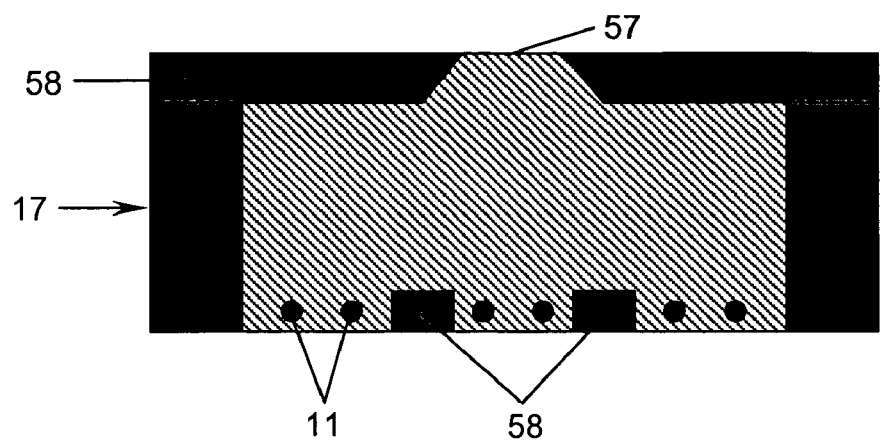
FIG. 8 shows a cross-sectional schematic of a top fiber of a plasma display with absorbing regions to create a small slit and three separate sustain electrodes.
Figure 9:
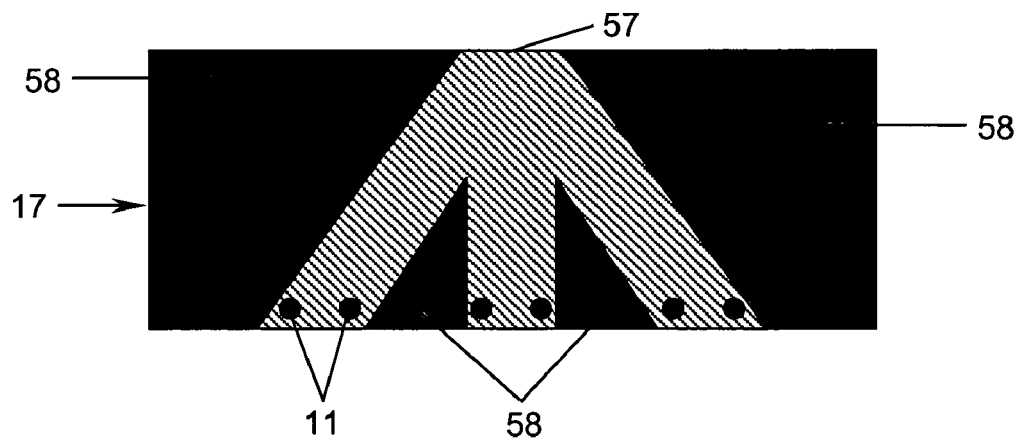
FIG. 9 shows a cross-sectional schematic of a top fiber of a plasma display with absorbing regions to create a small slit and three separate sustain electrodes.
Figure 10:
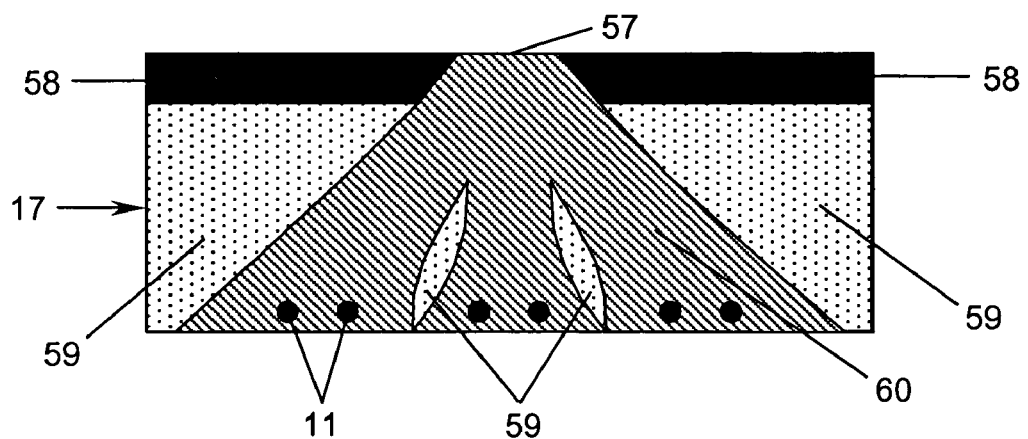
FIG. 10 is a cross-sectional schematic of a top fiber of a plasma display with absorbing regions to create a small slit and light guide regions to the small slit and three separate sustain electrodes.

FIGS. 8 and 9 are schematic cross-sectional views of a top fiber 17 for a surface discharge plasma display that generates three separate images. A plasma is generated between the sustain electrodes 11 below the fiber 17. The light generated from the plasma is blocked by the absorbing layer 58 everywhere except in a direction from the point of generation through the slit aperture opening 57 at the top of the fiber 17. The generated light may be blocked only at the slit aperture 57 and at the delineation the three separate generation zones (FIG. 8). Alternatively, the generated light may be blocked everywhere except in the path from the generation to aperture 57 (FIG. 9). To increase the collection efficiency, light guiding regions can be built into the fiber 17. FIG. 10 schematically illustrates one method of constructing the top fiber 17 from a high index material 60 and a low index material 59 to help collect and guide the light toward the slit aperture opening 57.

FIGS. 8–10 are examples used to illustrate the use of an absorbing material to block light or combining high and low index optical materials to collect and guide light in a specific direction or desired location. The examples are not intended to limit the scope of the invention, since many different fibers can be constructed in any size, shape or configuration with different blocking layer and wave guides without deviating from the intended scope of the invention.

One potential problem is fabricating fibers 17 containing more than one material. One potential method of forming these fibers 17 is to use hot glass/plastic extrusion to form preforms then draw the preforms into fiber using a fiber draw process. More than one material can be co-extruded to form the preforms. During the hot glass/plastic extrusion process two or more materials are forced to flow through an intricately shaped extrusion die where they flow together to form the preform with at least two dissimilar materials. Hot glass/plastic extrusion is a preferred method of forming preforms for the fiber draw containing multiple materials because tight tolerances can be held on both shape and size. In addition, both internal and external complicated shapes can be formed, which include apertures and lenses.

Figure 11:
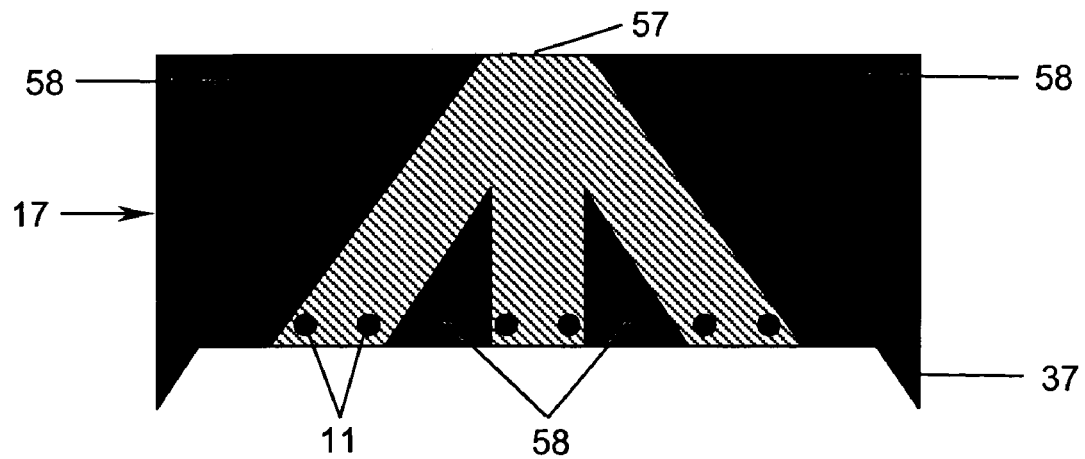
FIG. 11 shows a cross-sectional schematic of a top fiber of a PALC display with absorbing regions to create a small slit and three separate pairs of address electrodes.
Figure 12:
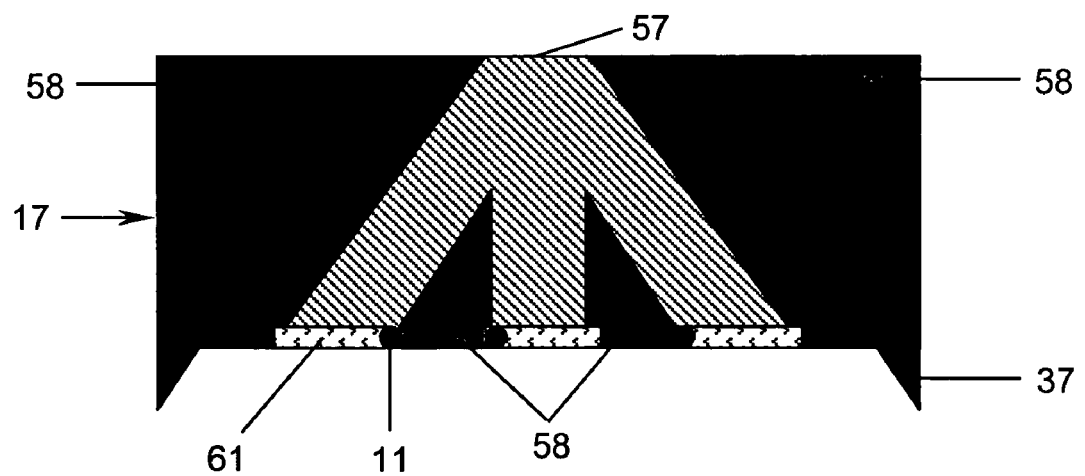
FIG. 12 shows a cross-sectional schematic of a top fiber of a PALC display with absorbing regions to create a small slit and three separate pairs of address electrodes consisting of a conductive wire connected to a transparent conductive region.

FIGS. 11 and 12 are examples of how the top PALC fibers 17 are used to create a multiple view or stereoscopic display. The examples are similar to those of the plasma top fibers 17 in FIG. 9 except the liquid crystal spacer 37 is also built into the fiber 17. In FIG. 11, the address electrodes 11 are composed of two wire electrodes, 11 and 61, that are used to create the electric field to modulate the liquid crystal. In FIG. 12, the address electrode contains a conductive wire electrode 11, which is connected to a thin transparent conductive electrode 61. The fibers 17 are preferably constructed from either glass or plastic (polymer). A top PALC fiber is shown as another example of a multiple view display constructed using a fiber array with slit and electrodes. The technology is not limited to plasma and PALC displays, it can also be used to create FED, CRT, electroluminescent, and types of similar displays.

Figure 13:
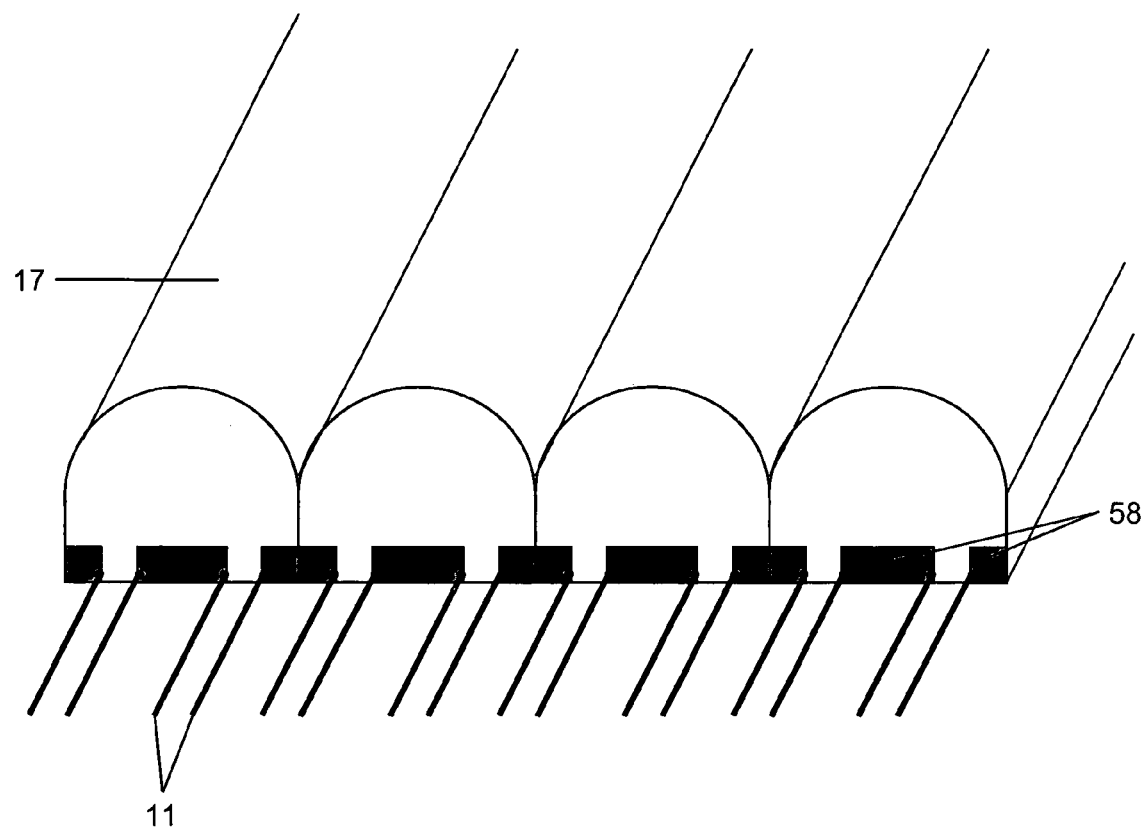
FIG. 13 illustrates a fiber-based lenticular lens system with wire electrodes.

FIG. 13 illustrates building a lenticular lens function into the top fibers 17 of a surface discharge plasma display. By adding at least two pairs of sustain electrodes 11 to each fiber 17, which contains a lenticular lens on the opposite side of the electrodes, a three-dimensional stereoscopic image is generated. To sharpen the image in the viewing zones, an aperture has to be added to the fiber to block the light generated outside sustain electrode 11 region. The generated light is slightly blocked by the sustain electrodes 11, however additional blocking material 58 has to be added to the fiber. This blocking material 58 is preferably an absorbing black material or a reflecting material, such as opal glass. An advantage to adding the lens function to the top fiber is that the lens is always aligned with both the aperture grill and the light generating region (i.e. the address electrodes). This integration eliminates any requirements for alignment and since each stereopair is contained within each individual fiber, lateral run out of the top fiber is not an issue. Also, since very long fibers can be drawn, very large three-dimensional displays can be manufactured.

Figure 14:
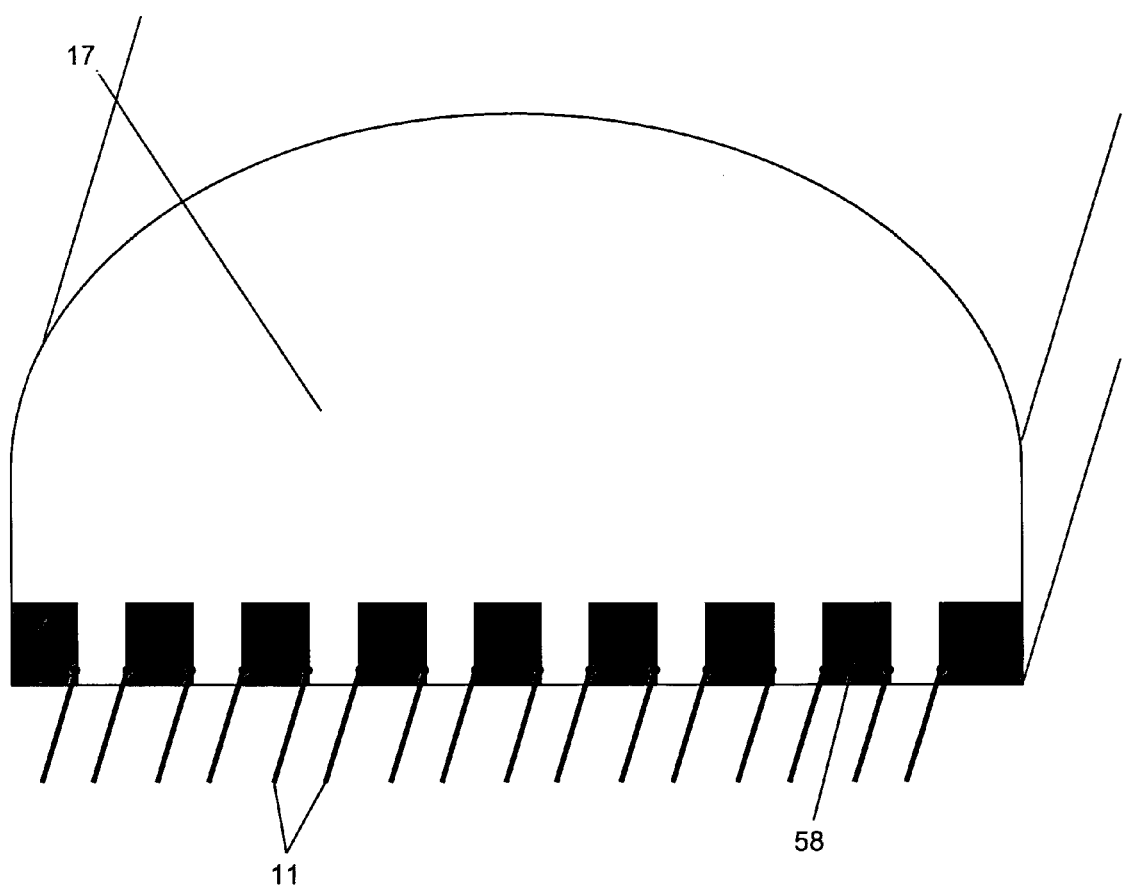
FIG. 14 illustrates a fiber-based lenticular lens system with eight potential views.

In order to generate more than one stereopair or more than two views across the viewing zone in front of the display, more than two sets of sustain electrodes are added to each top fiber 17. As an example, FIG. 14 shows a top fiber 17 with eight sets of sustain electrodes 11. The eight sets of sustain electrodes 11 generate eight separate side-by-side views in front of the display. Fibers with several lenticular lenses with a corresponding multitude of sustain electrodes can be drawn in a single fiber without deviating from the spirit of the invention.

Figure 15:
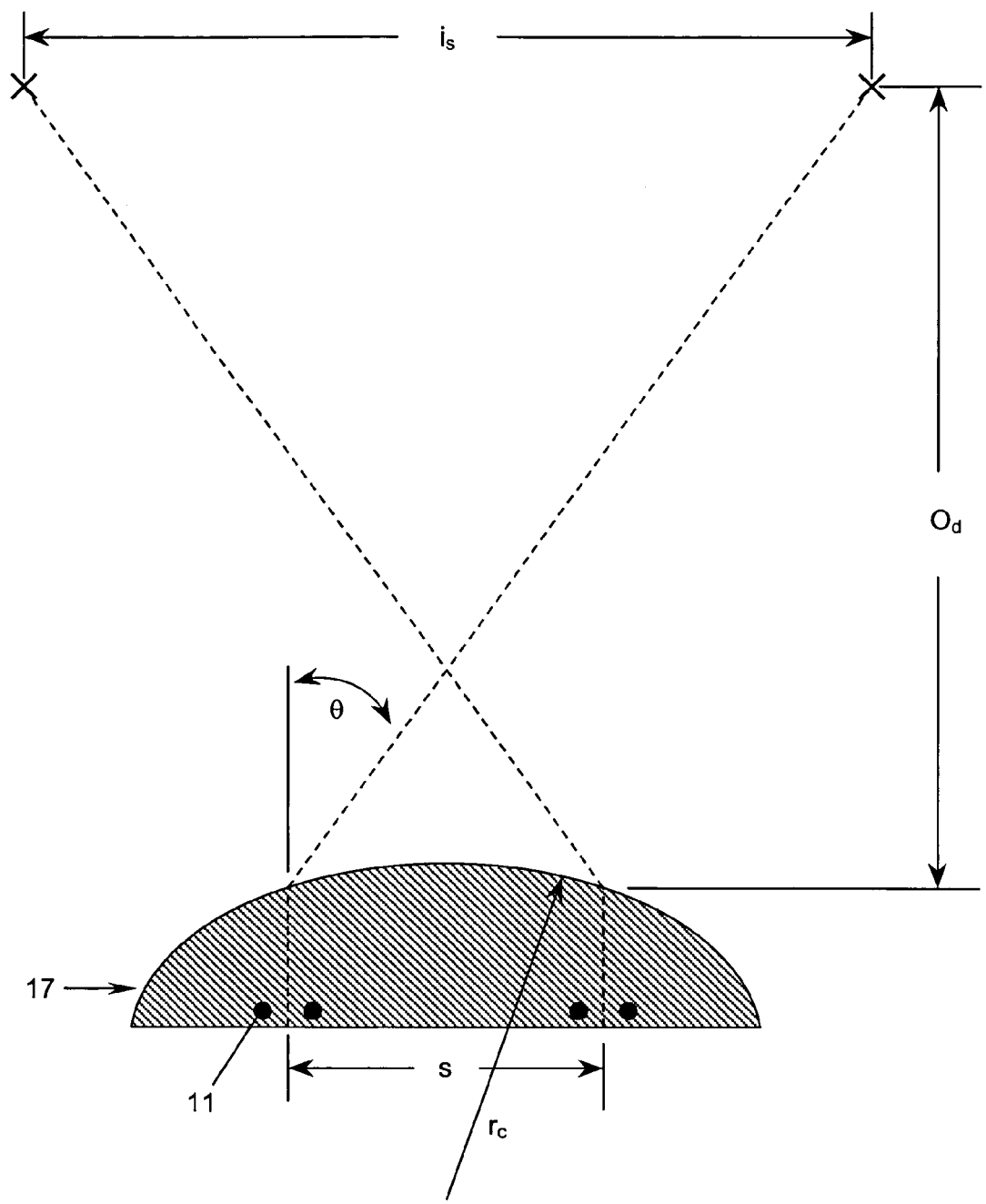
FIG. 15 shows a cross-sectional schematic of a lenticular lens showing the ray traces that form the two images.

FIG. 15 schematically shows a cross-section of a lenticular lens top fiber 17 with ray traces (dotted lines) from light generation points to an image separation distance, $i_s$, at points labeled with an X. Light going through the fiber refracts at the surface of the lens at an angle, θ, given by:

$$\tan\theta = s/2f$$

where s is the separation between the plasma sustain electrode pairs and f is the focal length of the lenticular lens. The radius of curvature of the lens, $r_c$, is related to the focal length by:

$$r_c = (n-1)f$$

where n is the refractive index of the fiber material. θ is related to the observer distance, $O_d$, and the image separation distance, $i_s$, by:

$$\tan\theta = i_s/2O_d$$

Therefore, the image is related to the fiber geometry by the equation:

$$i_s/O_d = s(n-1)/r_c$$

As an example, assuming a fiber index (n) of 1.5 and a plasma separation (s) of 0.4 mm, to view a stereoscopic image at 20 inches away from the display the radius of curvature of the top fiber lenticular lens has to be 1.6 mm.

Figure 16:
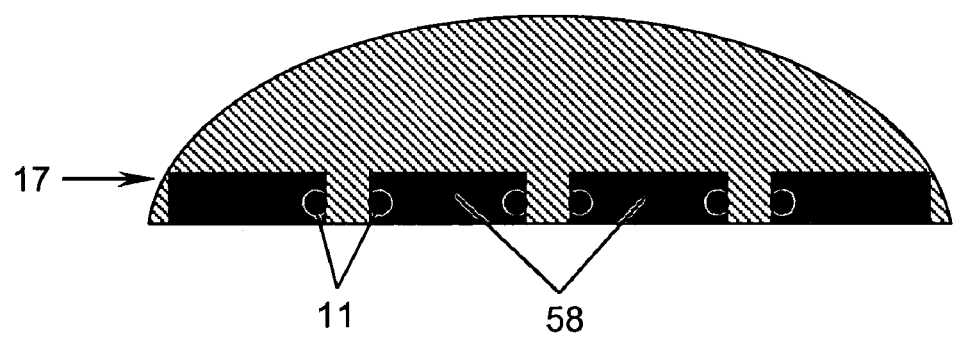
FIG. 16 shows a cross-sectional schematic of a lenticular lens top fiber of a plasma display with three sets of sustain electrode pairs.
Figure 17:
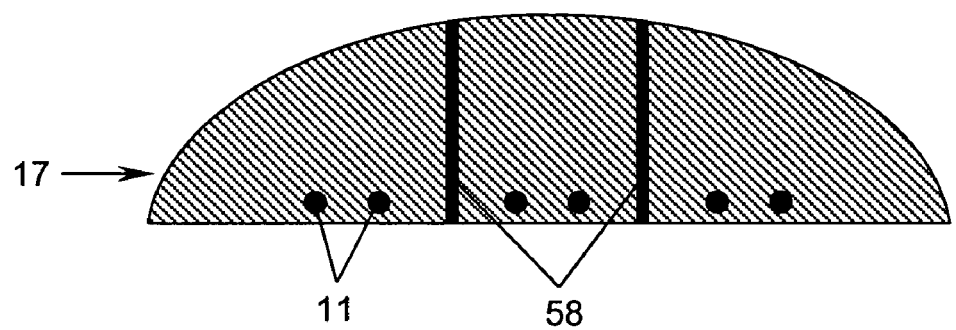
FIG. 17 shows a cross-sectional schematic of a lenticular lens top fiber of a plasma di splay with three sets of sustain electrode pairs.

FIGS. 16 through 22 represent schematic cross-sections of the top fiber lenticular lens 17 in accordance with the present invention. FIG. 16 shows a top lenticular lens fiber 17 with three sets of sustain electrodes 11, which generates three separate images. The image generation region is highlighted by adding an aperture 58 to the system, which defines a point light source generation. FIG. 17 shows a similar fiber except the three sustain electrode 11 regions are separated by the aperture 58 that extends the entire height of the fiber 17.

The lens function in the previously described lenticular lens fibers is formed by shaping the surface of the fiber to a specific radius of curvature. Although all of the previous examples depict a convex shape fiber surface, a concave fiber shape is also an object of the invention.

Figure 18:
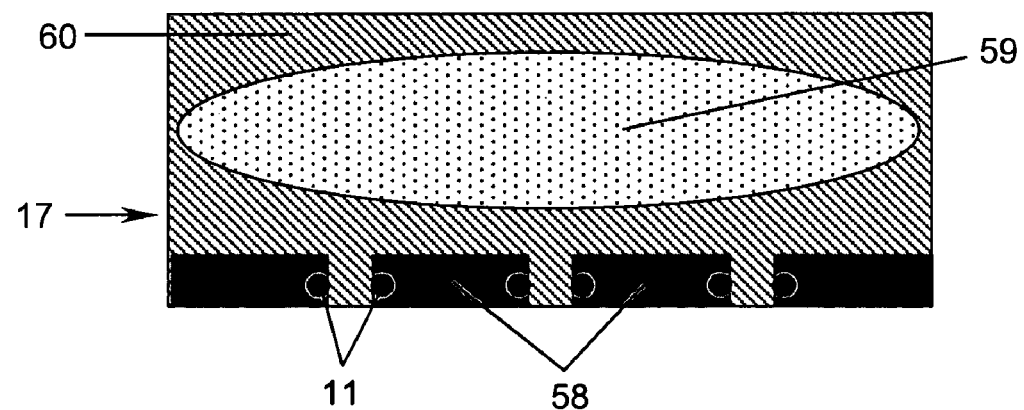
FIG. 18 shows a cross-sectional schematic of a lenticular lens top fiber of a plasma display where the lens is formed inside the fiber with a different index material.

Another method of forming a fiber 17 with a lens 59 is to contain the lens within the fiber. FIG. 18 shows a rectangular top fiber 17 with a lens 59 formed inside the fiber. If the refractive index of the lens material 59 is higher than the surrounding glass fiber material 60, then the lens 59 functions as a convex lens. However, if the surrounding material 60 is higher in refractive index than the lens material 59, the lens functions as a concave lens. The shape of the lens 59 within the fiber 17 may also be concave. Creating the lens 59 within the fiber 17 allows for a rectangular shaped fiber, which is easier to process as an array to build a display.

Figure 19A:
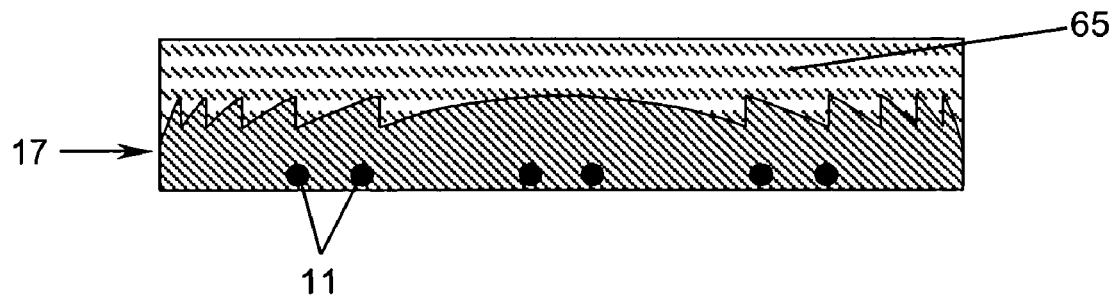
FIG. 19a shows a cross-sectional schematic of a lenticular lens top fiber of a plasma display where the lens is a Fresnel lens formed on the surface using a lost glass process.
Figure 19B:
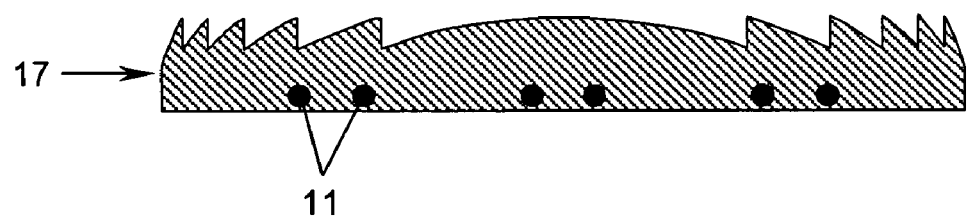
FIG. 19b shows a cross-sectional schematic of a lenticular lens top fiber of a plasma display where the lens is a Fresnel lens formed on the surface using a lost glass process.
Figure 20:
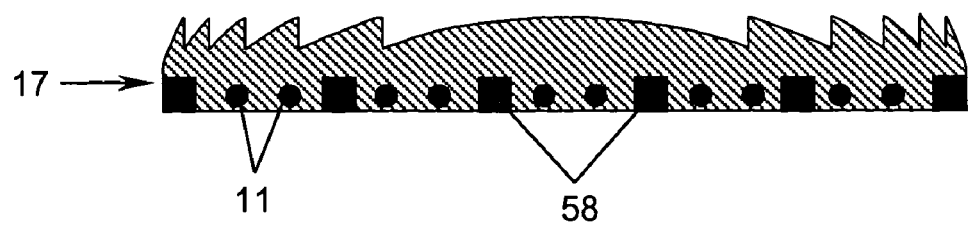
FIG. 20 shows a cross-sectional schematic of a lenticular lens top fiber of a plasma display that has five viewing zones where the lens is a Fresnel lens.

The surface shape of the lenticular lens can also be broken down into a Fresnel lens as shown in FIGS. 19 and 20. A Fresnel lens has the same surface curvature as a lenticular lens, but the surface of the lens is cut at specific intervals and collapsed down into a plane. FIGS. 19*a* and 19*b* show the formation of this top Fresnel fiber 17 using a lost glass process. The method of forming the fiber initially forms a much larger size replica of the fiber in a preform, which is drawn down into fiber while adding the wire electrodes.

During this draw process, the fiber can change shape at sharp points or steep side walls. By adding an additional dissolvable glass to the fiber during the draw process, the proper shape is maintained during the draw process. After the fiber 17 has been formed (FIG. 19*a*), the dissolvable glass section 65 is removed using a wet etch solution. The remaining fiber (FIG. 19*b*) has the exact size and shape needed to perform the desired function. The lost glass process is applicable when forming any desired surface structure or any lens shape.

Figure 21:
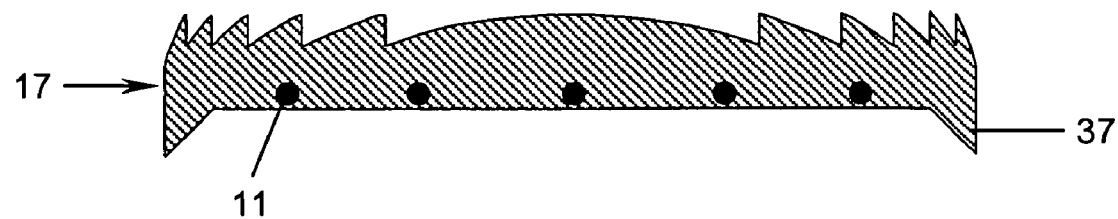
FIG. 21 shows a cross-sectional schematic of a lenticular lens top fiber of a PALC display.
Figure 22:
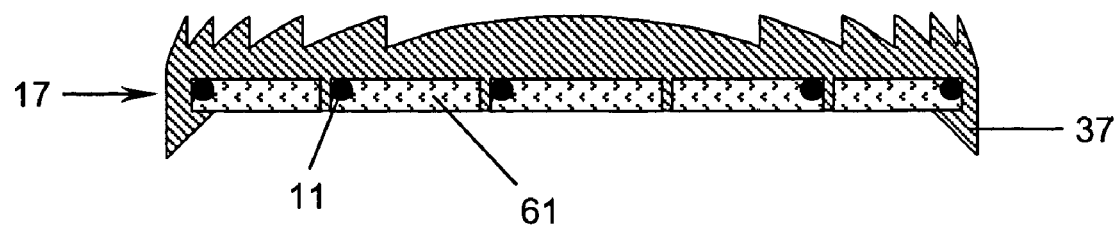
FIG. 22 shows a cross-sectional schematic of a lenticular lens top fiber of a PALC display with transparent electrodes.

FIG. 20 is an example of a Fresnel lens top fiber 17 for a surface discharge plasma display with five different viewing zones. The viewing zones are sharpened by the aperture grill 58 in the top fiber 17 array. Other types of three-dimensional electronic fiber-based displays, including a PALC display, may also be formed using the lenticular lens system. Potential lenticular lens top fibers for a PALC display are shown in FIGS. 21 and 22. The figures represent the Fresnel lens method of forming the top fibers 17. FIG. 21 shows a five viewing zone display where the liquid crystal in the display is modulated by a single wire electrode 11. In FIG. 22, the electric field is spread over a wider region by connecting the wire electrode 11 to a transparent conductor pad 61. The top fibers are preferably fabricated using glass or plastic (polymer).

Figure 23A:
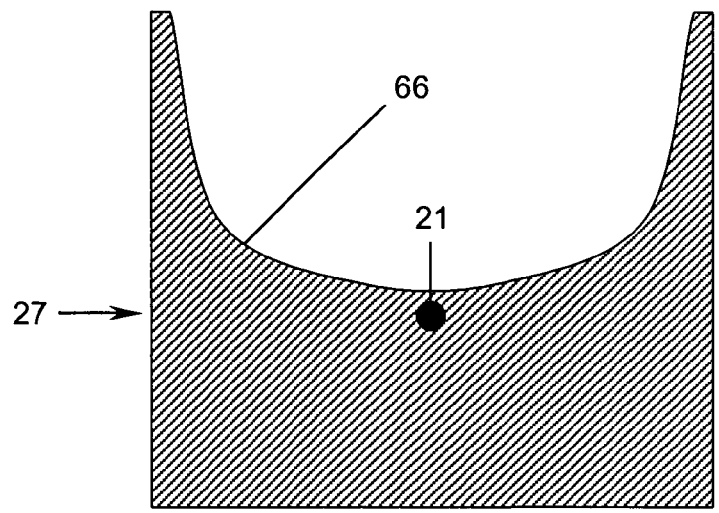
FIG. 23a shows a cross-sectional schematic of a bottom fiber of a plasma display with curved plasma channel to focus the generated light.
Figure 23B:
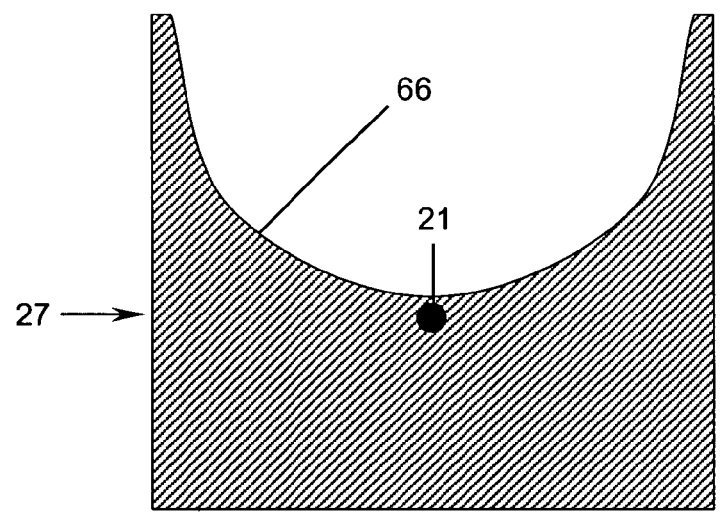
FIG. 23b shows a cross-sectional schematic of a bottom fiber of a plasma display with curved plasma channel to focus the generated light.
Figure 23C:
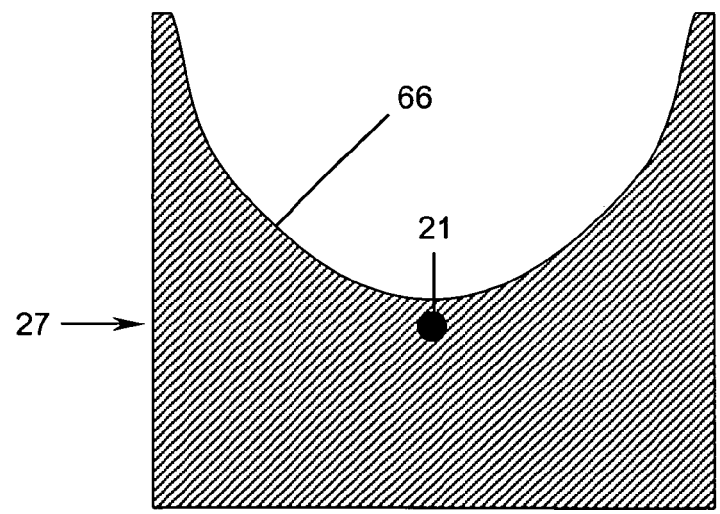
FIG. 23c shows a cross-sectional schematic of a bottom fiber of a plasma display with curved plasma channel to focus the generated light.

A lens function may also be built into the bottom fibers 27 of the display. FIGS. 23*a* through 23*c* schematically show how a lens function is built into the bottom fiber 27 by controlling the shape of the channel 66 for the plasma display. Since the channel 66 is coated with phosphor, which is the point of generation of the light, channels with different curvatures tend to focus the light at different depths. Many of the emissive displays, such as the plasma display, have a lens function built into the location where the phosphor or electroluminescent material is deposited.

Figure 24A:
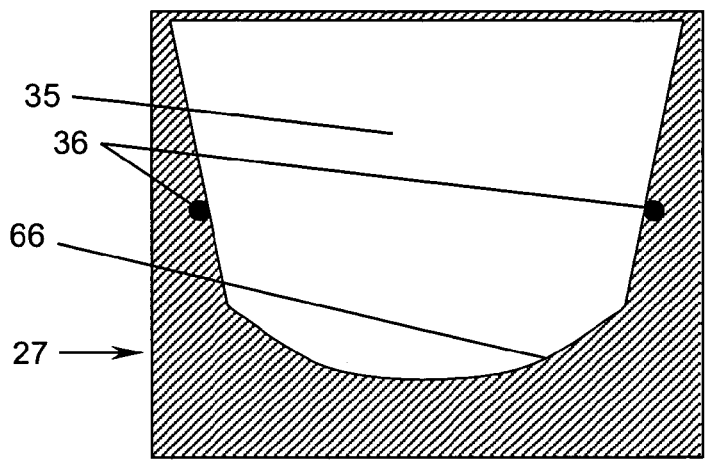
FIG. 24a shows a cross-sectional schematic of a bottom fiber of a PALC display with a lens built into the fiber inside the hollow plasma channel.
Figure 24B:
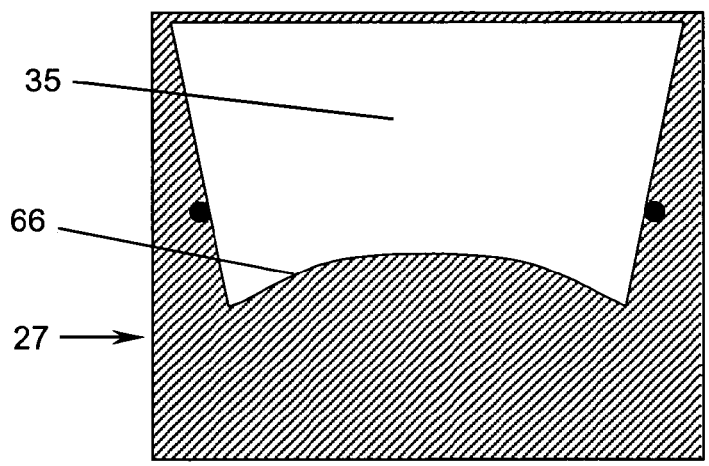
FIG. 24b shows a cross-sectional schematic of a bottom fiber of a PALC display with a lens built into the fiber inside the hollow plasma channel.
Figure 25:
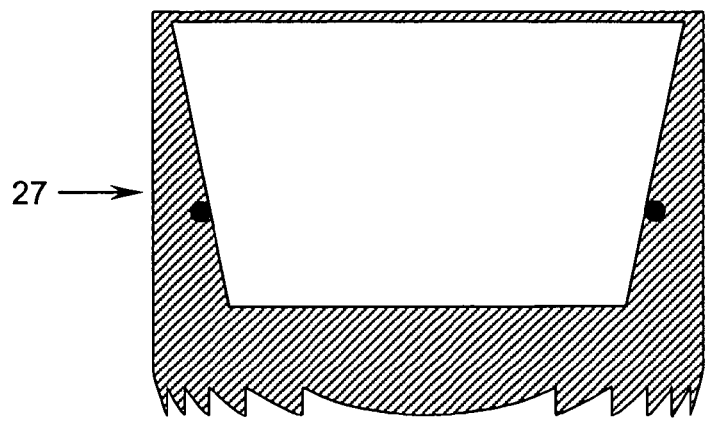
FIG. 25 shows a cross-sectional schematic of a bottom fiber of a PALC display with a Fresnel lens built into the surface of the fiber.
Figure 26:
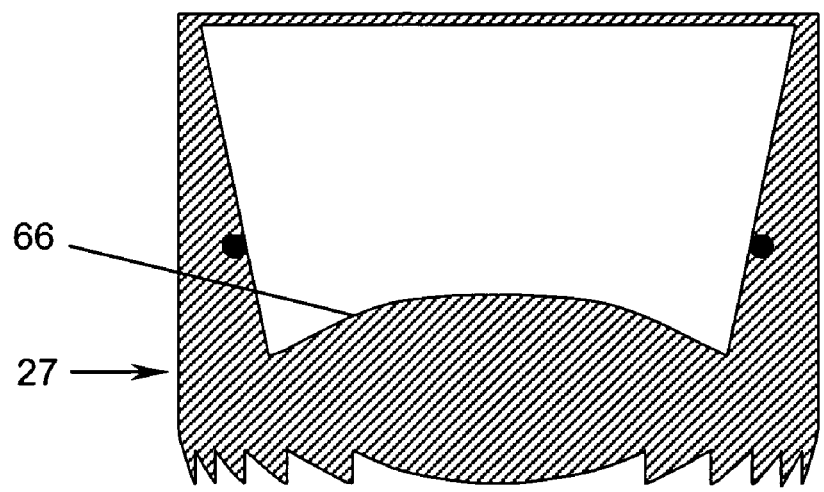
FIG. 26 shows a cross-sectional schematic of a bottom fiber of a PALC display with a lens built into the fiber inside the hollow plasma channel and a Fresnel lens built into the surface of the fiber.

FIGS. 24 through 26 show a lens function designed into the hollow bottom fibers of a PALC display. FIG. 24 shows the lens 66 built into the fiber inside the plasma discharge cell 35. As light passes through the bottom of the plasma discharge cell 35, light travelling through the fiber 27 from the bottom to the top will experience a concave lens in FIG. 24*a* and a convex lens in FIG. 24*b*. In FIG. 25, the lens function is added outside the bottom fiber 27. In this fiber, the lens 66 is representative of a Fresnel lens which focuses the light as it pass through the fiber. FIG. 26 shows a combination of lenses, one inside the fiber 66 and one outside the fiber (Fresnel lens), added to the bottom fiber 27 of a PALC display.

Figure 27:
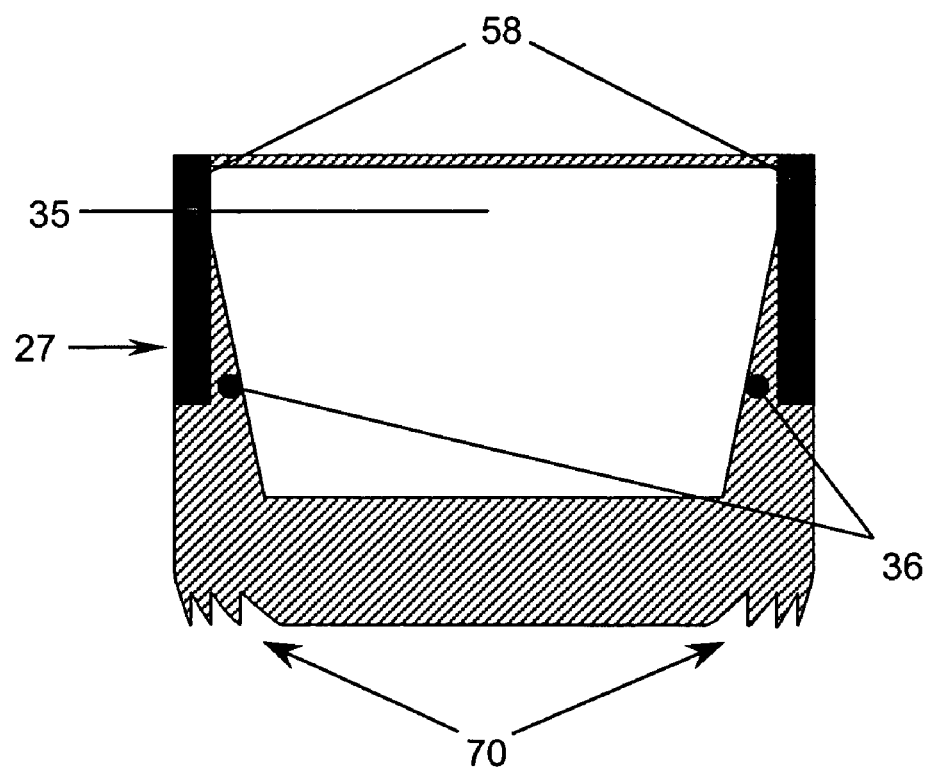
FIG. 27 shows a cross-sectional schematic of a bottom fiber of a PALC display with a quasi-Fresnel lens built into the surface of the fiber to direct the light into the hollow plasma channel.

Another aspect of building a lens function into the fiber is shown in FIG. 27. In this figure a "Fresnel lens" 70 is added to the bottom of the bottom PALC fiber to redirect the light initially coming through the sides of the fiber toward the center of the fiber. Since the only region where the liquid crystal can be modulated is above the plasma discharge cell 35, any light outside this region is lost, especially the light incident on the plasma electrode 36 or the black matrix material 58. Building a focusing lens into the bottom sides of the PALC fiber increases the overall light transmission by approximately 25%.

Figure 28:
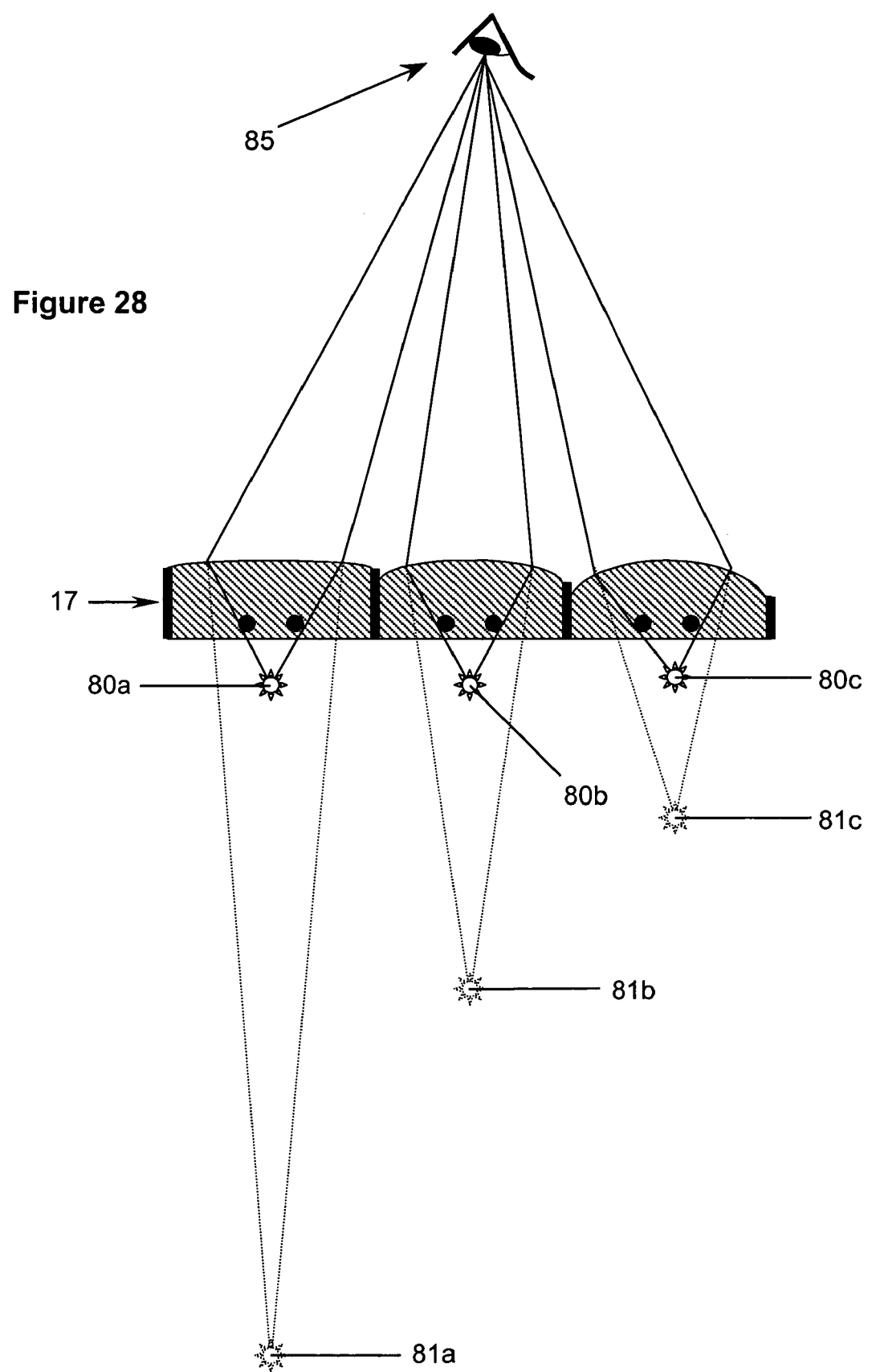
FIG. 28 shows a ray trace of how a three-dimensional image is generated with varying viewing depth at each pixel using fibers with a built in lens function.

FIG. 28 illustrates another three-dimensional display in accordance with the present invention. A lens function is added to the top fiber of a fiber-based electronic display to vary the apparent distance of the image 81 from the viewer 85 on a pixel by pixel basis. The three separate lenses in FIG. 28 represent a single pixel in a plasma display. The three lenses are contained within a single fiber 17 and are aligned to the sustain electrodes during the fiber draw process. The pixel image is written on one of the three discharge cells, 80*a*, 80*b*, or 80*c*. Depending on the chosen discharge cell, the viewer experiences the image at 81*a*, 81*b*, or 81*c*. Therefore, in a given pixel, if plasma cell 80*b* is ignited, the image is perceived to have originated at a depth at 81*b* in that pixel location. The lenses and electrodes are part of each top fiber 17 and the fibers are arrayed across the surface of a display, which is used to create the image on the screen. The image is written on either of the three different focal points at each and every pixel across the display, therefore the focus of each pixel is controlled across the display. Controlling the apparent distance from which the image is viewed at each pixel creates a three-dimensional image. Assembling the top fibers 17 such that they run horizontally allows the viewer to have about a 160° viewing angle without affecting the three-dimensional image. The vertical viewing angle should be greater than 90° with little effect on the three-dimensional image, but the vertical viewing angle will not have a viewing cone as large as the viewing cone in the horizontal direction.

Figure 29:
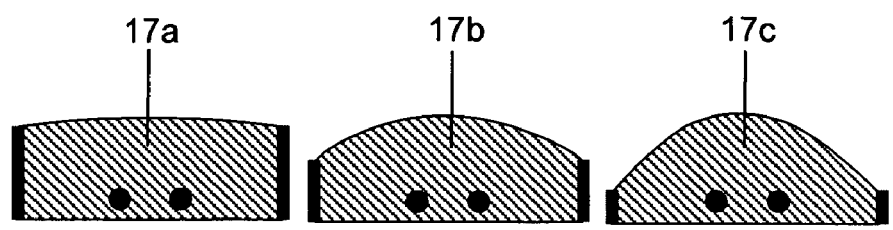
FIG. 29 shows a cross-sectional schematic of a set of top fibers used to create a three-dimensional image with varying depth.

FIG. 29 shows the top fiber 17 broken down into individual fibers 17*a*, 17*b* and 17*c*. Individual fibers with different lens functions are combined in a display to yield many different depths of field. If not as much depth of field is needed in certain locations in the display, different numbers of individual fibers 17 with varying focal lengths are used across the display, for example at the top to the display, which is mainly far focused sky. Many different pixel lines can be included in a single fiber. Each one of the pixel lines have several sets of sustain electrodes with different lens designs above each.

Figure 30:
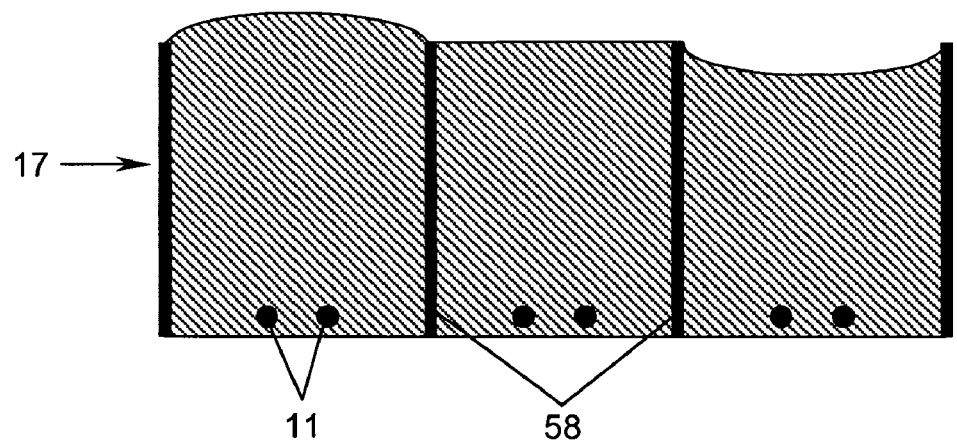
FIG. 30 shows a cross-sectional schematic of top fiber of a plasma display used to create a three-dimensional image with varying depth.
Figure 31:
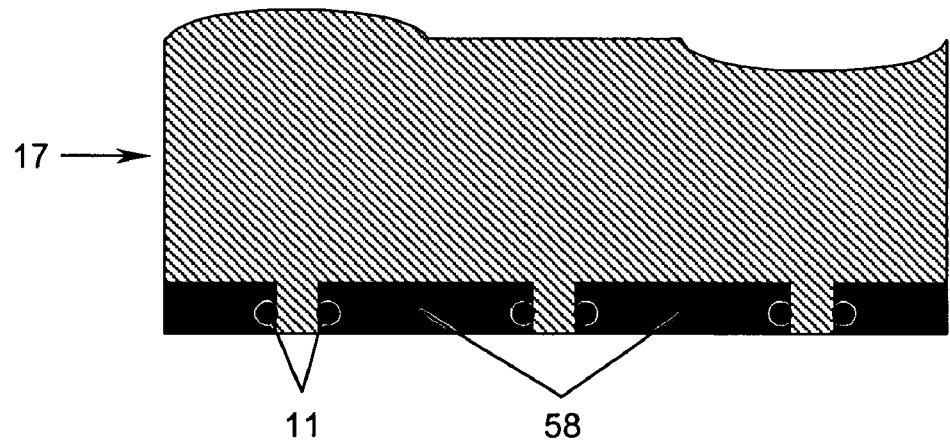
FIG. 31 shows a cross-sectional schematic of top fiber of a plasma display used to create a three-dimensional image with varying depth.

FIG. 30 illustrates that the lenses above the sustain electrodes 11 or plasma generation regions are preferably convex, flat or concave. Using lenses with different focal lengths, i.e. radii of curvature, allows the image to be perceived to reside inside the display or pop out of the display. The horizontal viewing distance is limited if the lenses are designed such that the image comes out of the display. FIG. 31 shows a cross-sectional schematic of the top fiber 17 with an aperture grill 58 placed at the bottom of the fiber 17. This aperture grill 58 blocks some of the light, but the optical system is cleaner since the light is only emanating from a single point.

Figure 32:
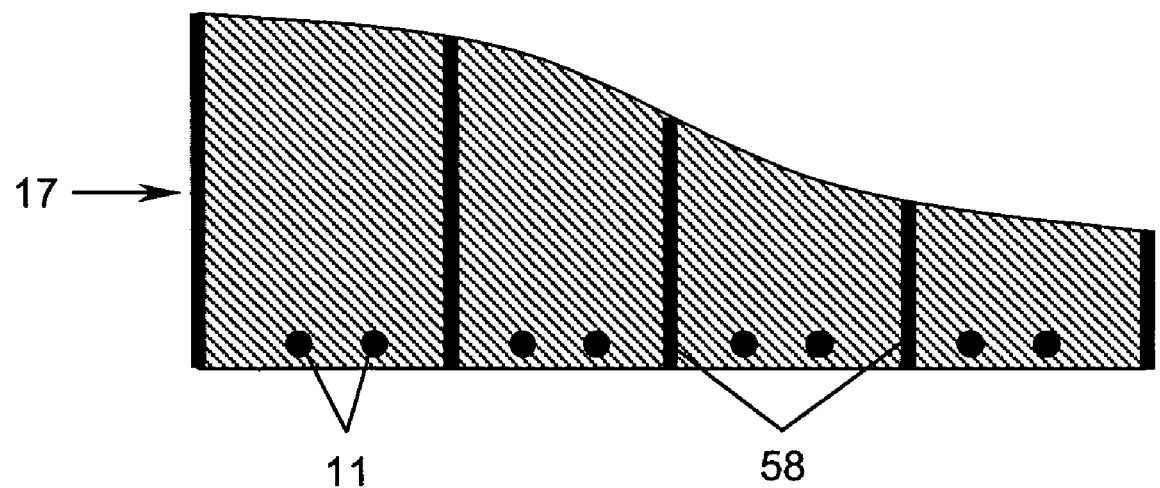
FIG. 32 shows a cross-sectional schematic of top fiber of a plasma display with a lens having a continuously varying focal length used to create a three-dimensional image with varying depth.
Figure 33:
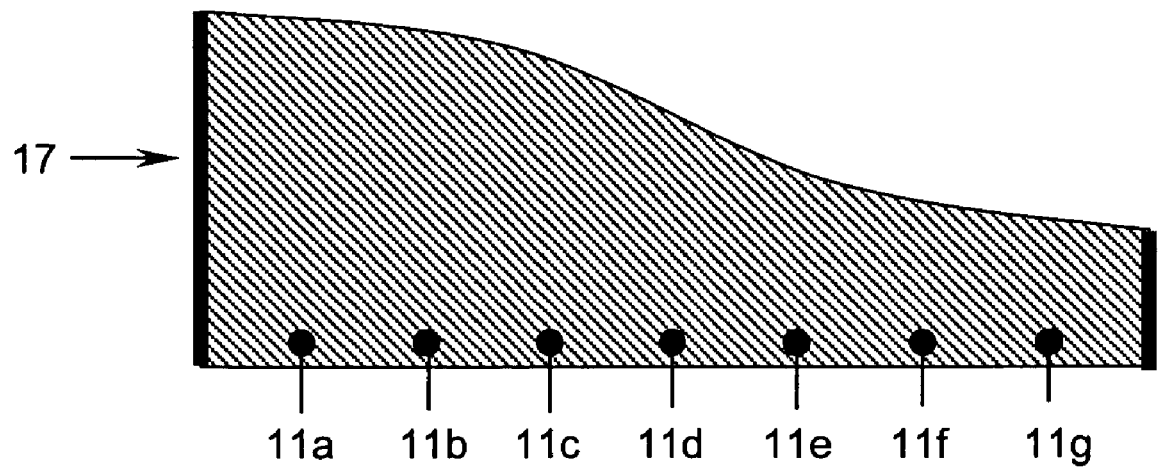
FIG. 33 shows a cross-sectional schematic of top fiber of a plasma display with a lens having a continuously varying focal length used to create a three-dimensional image with varying depth.

FIGS. 32 and 33 illustrate a continuously varying lens function on the surface of the top fiber 17. Notice that the curvature of the fiber 17 changes from convex on the left side to concave on the right side. FIG. 32 illustrates a fiber 17 with four different focal lengths, where each zone is separated by an absorbing material 58. FIG. 33 shows a fiber with six possible focal distances. Since only one set of electrodes 11 are used for each pixel, placing the sustain electrodes 11 on the same pitch allows the plasma to be ignited between any pair of the electrodes. Placing the electrodes 11 on the same pitch not only reduces the number of wire electrodes by almost one half, it also reduces the number of high voltage driver chips by one half. Reducing the amount of high voltage drive electronics results in a large reduction in cost.

Figure 34:
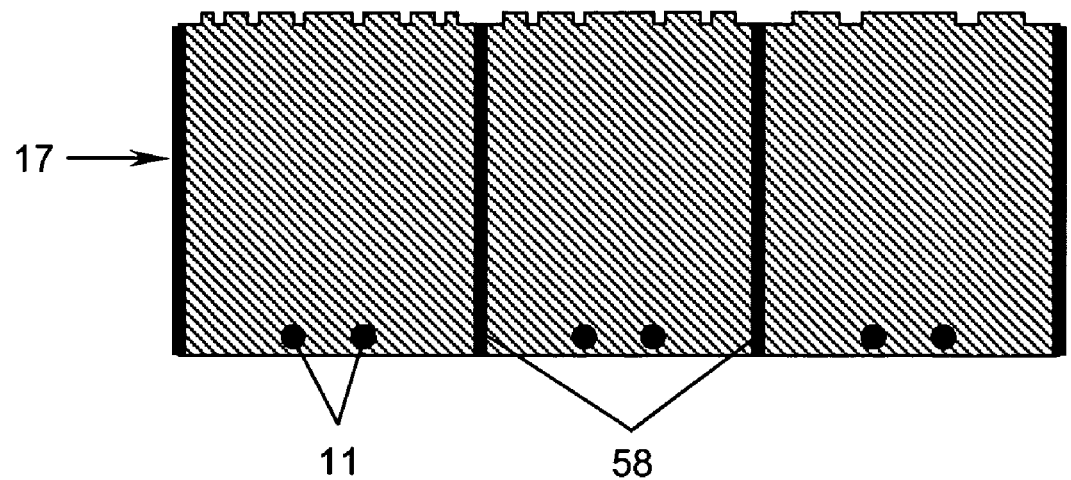
FIG. 34 shows a cross-sectional schematic of top fiber of a plasma display with a binary lens used to create a three-dimensional image with varying depth.
Figure 35:
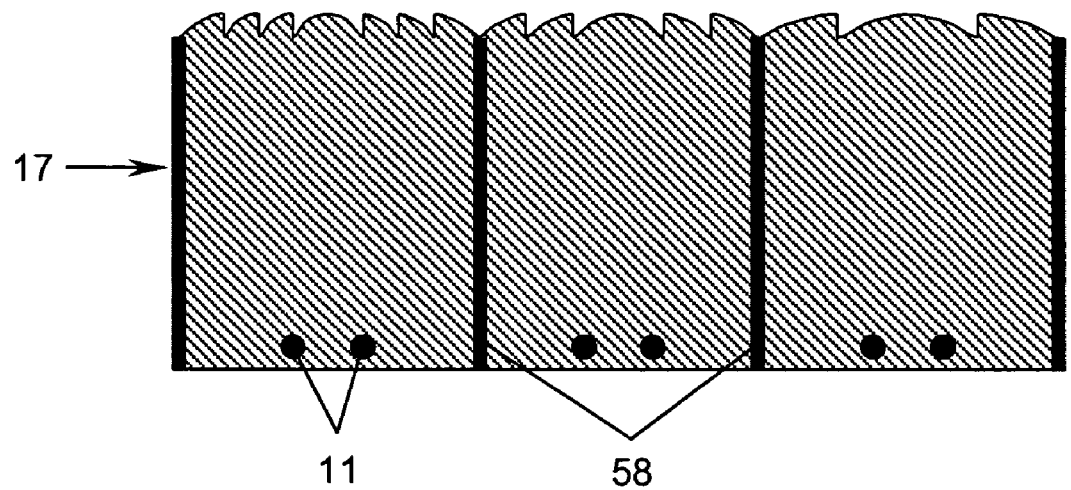
FIG. 35 shows a cross-sectional schematic of top fiber of a plasma display with a Fresnel lens used to create a three-dimensional image with varying depth.

FIG. 34 illustrates that the lens function on the surface can be created using a binary lens. One method of forming the binary lens in the surface of the fiber 17 requires a lost glass process, as discussed above, to hold the tight tolerances needed to achieve a high efficiency lens. Alternatively, the lens function on the surface is created using a Fresnel lens, as shown in FIG. 35. A Fresnel like lens can also be constructed to represent a continuously varying lens function to replicate a shape similar to that shown in FIG. 32. The Fresnel lenses may also be created using a lost glass process as discussed above.

Figure 36:
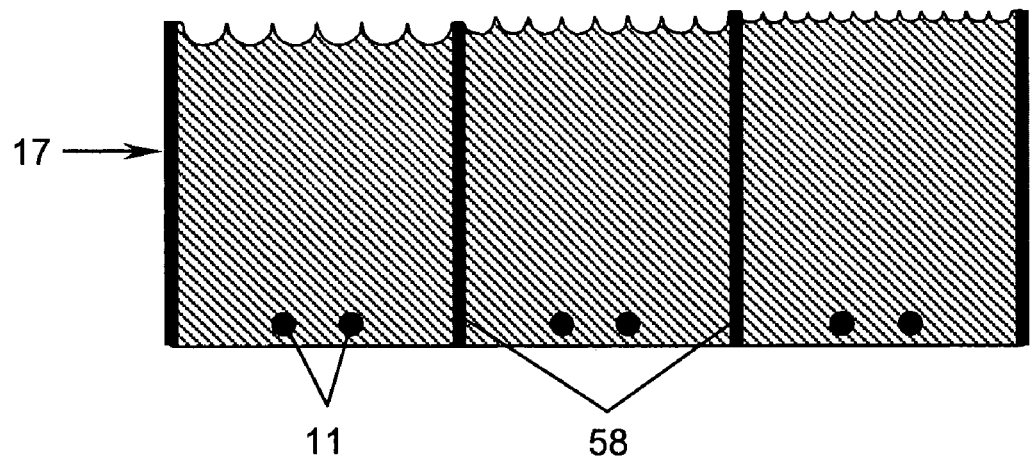
FIG. 36 shows a cross-sectional schematic of top fiber of a plasma display with a lenticular lens surface.
Figure 37:
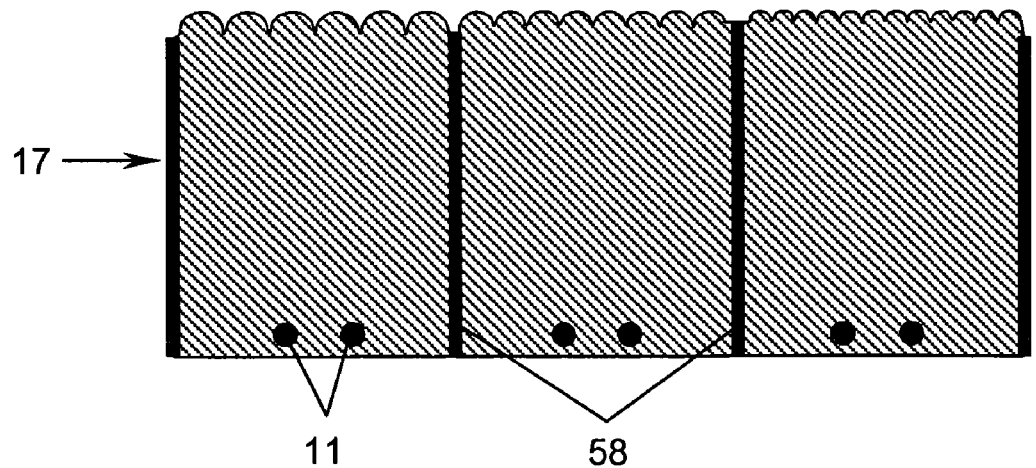
FIG. 37 shows a cross-sectional schematic of top fiber of a plasma display with a lenticular lens surface.

FIGS. 36 and 37 illustrate a "lenticular lens" array across each zone of the top fiber 17. Depending on the requirements of the focal length of the lens function, many small lenses across the surface of the fiber may be required. FIG. 36 and FIG. 37 show these lenses as concave and convex, respectively.

Figure 38:
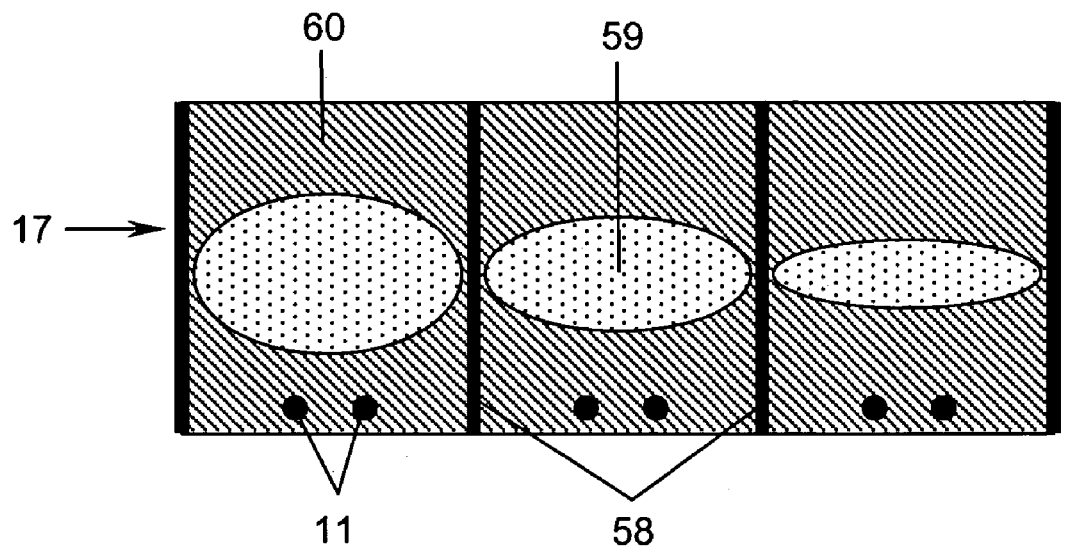
FIG. 38 shows a cross-sectional schematic of top fiber of a plasma display with a lens contained within the fiber formed with a different index of refraction material used to create a three-dimensional image with varying depth.
Figure 39:
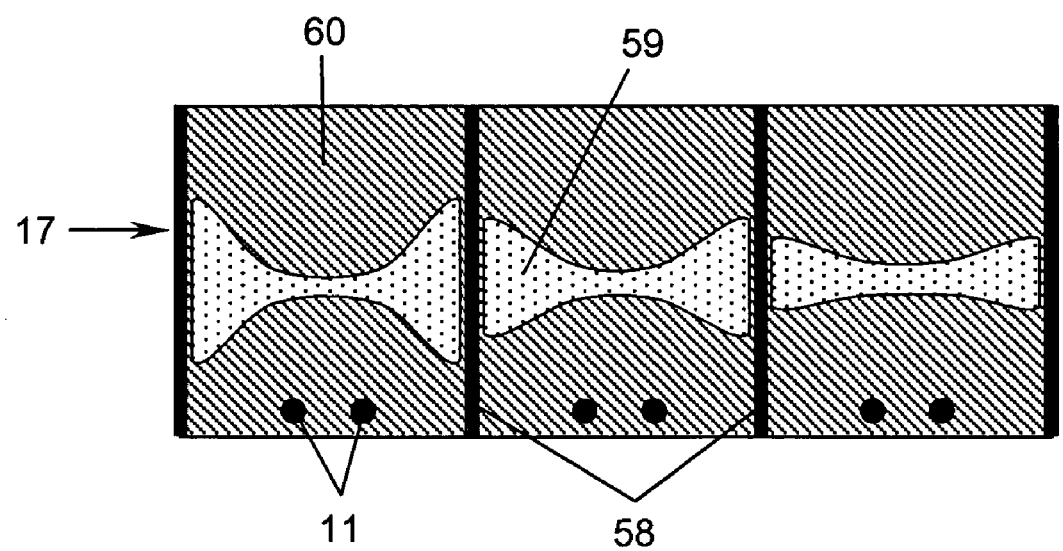
FIG. 39 shows a cross-sectional schematic of top fiber of a plasma display with a lens contained within the fiber formed with a different index of refraction material used to create a three-dimensional image with varying depth.

FIGS. 38 and 39 illustrate the concept of building the lens inside the fiber 17 using a material 59 with a different index of refraction than that of the base glass 60 of the fiber. If the index of the lens glass 59 is higher than the base glass 60, then the lenses in FIG. 38 are convex and are concave in FIG. 39. Whereas, if the index of the lens glass 59 is lower than the base glass 60, then the lenses in FIG. 38 are concave and are convex in FIG. 39. The continuously varying focal length lens, shown in FIG. 32, can also be created inside the fiber 17 using a two-index material glass fiber. Creating the lenses inside the fiber allows the fibers 17 to rest tightly against the top glass plate, such that the top glass plate does not interfere with the lens.

Figure 40:
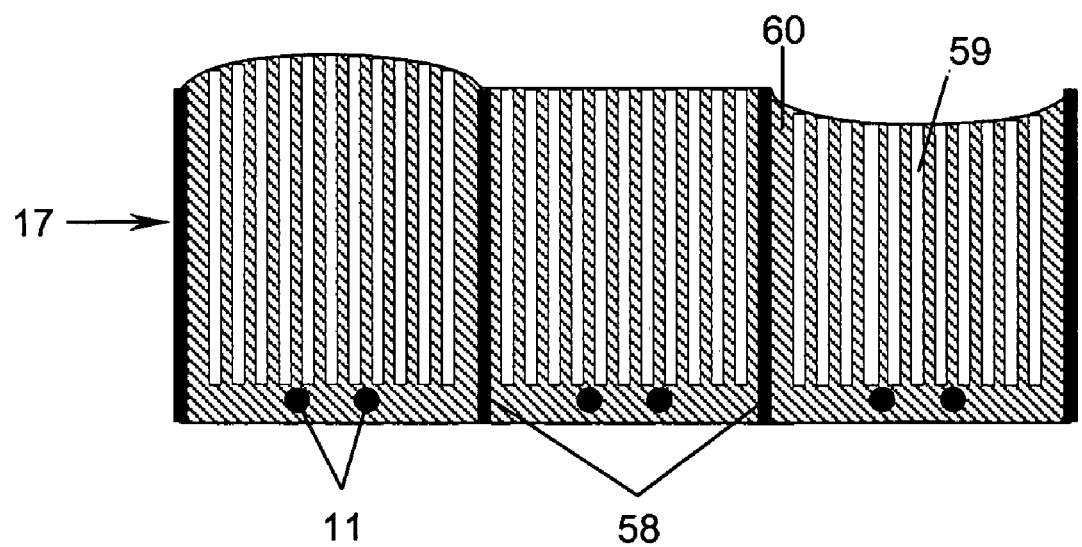
FIG. 40 shows a cross-sectional schematic of top fiber of a plasma display with collimated light regions formed with a different index of refraction material.
Figure 41:
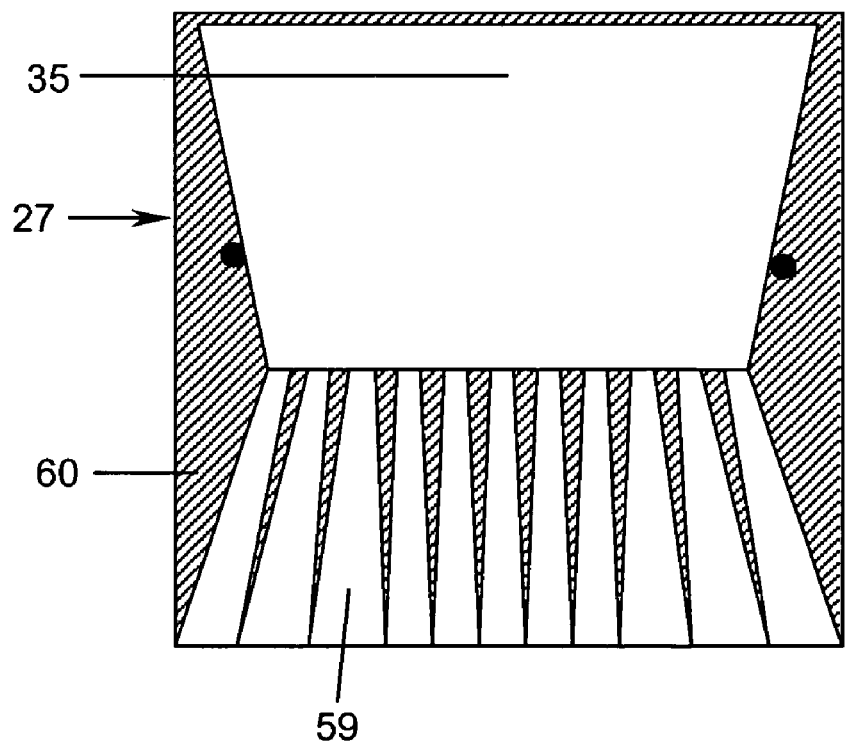
FIG. 41 shows a cross-sectional schematic of bottom fiber of a PALC display with light redirection regions formed with a different index of refraction material.

FIG. 40 illustrates how a two index material fiber can also be used to collimate the light passing through the fiber 17. Using a high 59 and a low 60 index glass (or vise versa), any askew light is channeled straight through the fiber 17 by the high index material. The two different index materials can also be used to collect or redirect light, as shown in FIG. 41. FIG. 41 is a cross-sectional schematic of a bottom fiber 27 of a PALC display. The high index material 59 interleaved with a low index material 60 is used to redirect the light going through the sides of the bottom fiber 27 so that it passes through the hollow plasma region 35. Any light travelling through the fiber 17 outside the hollow plasma region 35 will be lost since the liquid crystal is not modulated in that region. The bottom of the high index of refraction material 59 can be fanned out to capture all of the incident light.

All of the above examples revolve around adding lenses to the top fiber 17 of a plasma display to create a three-dimensional display by varying the apparent depth of the image from the viewer. Creating a three-dimensional display using fibers 17 with the lens function and electrodes 11 is also realized in many other types of electronic displays without deviating from the general scope of the invention. Other displays include PALC displays, FEDs, CRTs, electroluminescent displays, and types of similar displays.

Figure 42:
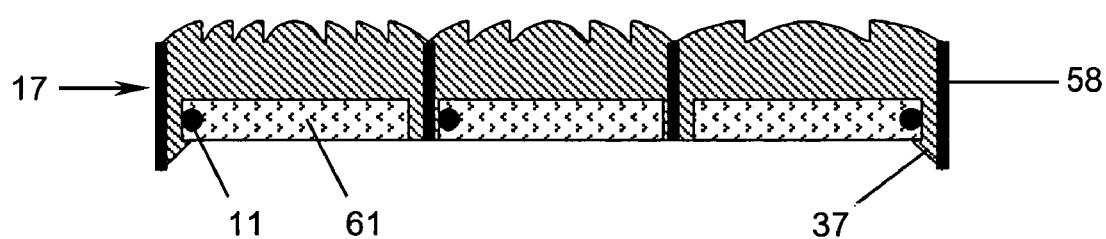
FIG. 42 shows a cross-sectional schematic of top fiber of a PALC display with a Fresnel lens surface used to create a three-dimensional image with varying depth.
Figure 43:
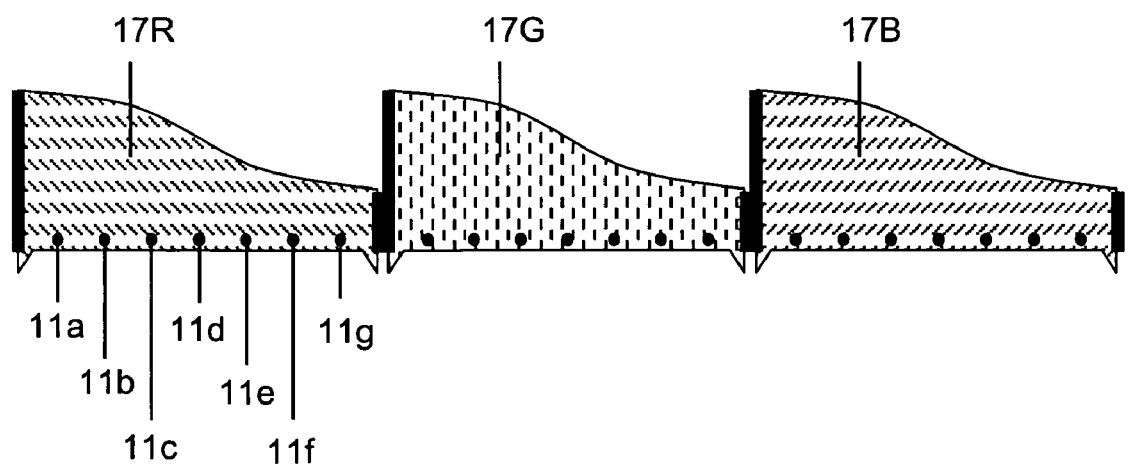
FIG. 43 shows a cross-sectional schematic of top fiber of a PALC display with a lens having a continuously varying focal length used to create a three-dimensional image with varying depth and where the fibers are colored to add color to the display.

Examples of how the technology can be used to create a three-dimensional PALC display are shown in FIGS. 42 and 43. FIG. 42 shows a top fiber 17 of a PALC display with three separate Fresnel lenses directly aligned with the electrodes 11 and 61. The wire electrode 11 is used to carry the current for the display and the transparent electrode 61 is used to spread the charge across the pixel. The liquid crystal spacers 37 and the black matrix function 58 are also built into the top fiber 17. In a standard PALC display, the color filter is placed over the top plate of the display. To add color to the fiber display, the fibers 17 are simply made from a colored material or coated with a colored coating.

FIG. 43 shows an array of three top fibers composed of red 17R, green 17G, and blue 17B material. Each of the individual subpixels (17R, 17G, 17B) has a continuously varying lens and seven wire electrodes 11 to modulate the light through the liquid crystal which creates depth for the three-dimensional display. The curvature of the lens for each of the three individual colors are slightly altered to correct for the chromatic aberration of the red, green and blue light. The fibers 17 are preferably fabricated out of glass or plastic.

To display an image with varying depth on the PALC display, voltages have to be applied to different electrodes 11 at the different pixel locations. The resolution of the depth map is increased by applying voltages to adjacent wire electrodes 11 in a given pixel location. Therefore, to increase the resolution of depth in the top fiber 17 in FIG. 43, the address electrode voltage which modulates the liquid crystal is applied to adjacent wire electrodes 11. Therefore, the liquid crystal can be turned on at any location between 11a to 11g by choosing to apply an address voltage to one or more of the electrodes 11a to 11g. For instance, if the depth map corresponds to a location between electrodes 11d and 11e, the address voltage is placed on both 11d and 1e. If the depth map corresponds to a location closer to electrode 11d than 11e, a higher voltage is applied to 11d than 11e. This generates a larger electric field closer to electrode 11d than 11e, hence turning the liquid crystal on closer to 11d. By using this voltage dividing scheme between adjacent top fiber electrodes 11, an almost continuous variation in image depth is achieved at each pixel.

To display an image with varying depth on a plasma display, a plasma discharge is created between different electrodes 11 at different pixel locations across the top fiber 17. However, referring back to FIG. 33, if a discharge is only formed between adjacent electrodes 11, only six bits of depth can be created in the plasma display. The intensity of a pixel is determined by turning the pixel on for a given length of time during each video frame in a plasma display. This intensity is applied to any one of the sustain electrode pairs 11 in the top fiber 17 to yield an image at the corresponding focus. The plasma is ignited in adjacent plasma cells during a single video frame to create more resolution in the depth map. Dividing the plasma discharge time up between two adjacent sustain electrodes 11 during a single video frame (1/60 sec) is equivalent to overlaying the depth map with the intensity map. In the case of the intensity, the eye integrates the light during each video frame and the viewer observes an overall brightness. By dividing the depth at a given pixel in a single video frame between two adjacent sustain electrode pairs, the eye integrates the focus of the image at that pixel and the viewer observes an image with a focus between the two focal points of the plasma cells. For instance, if the depth map corresponds to a location at electrode 11c then the plasma is ignited for half of the video frame time (intensity) between sustain electrodes 11b and 11c and is ignited between 11c and 11d for the other half of time (intensity). If the depth map corresponds to a location closer to 11d than 11c, then more of the intensity is generated between 11c and 11d than 11b and 11c. If the intensity map is broken down into the 256 bits of gray scale and there are four different pairs of sustain electrodes to create a plasma, then 256×4 or 1024 bits of depth can be created.

Figure 44A:
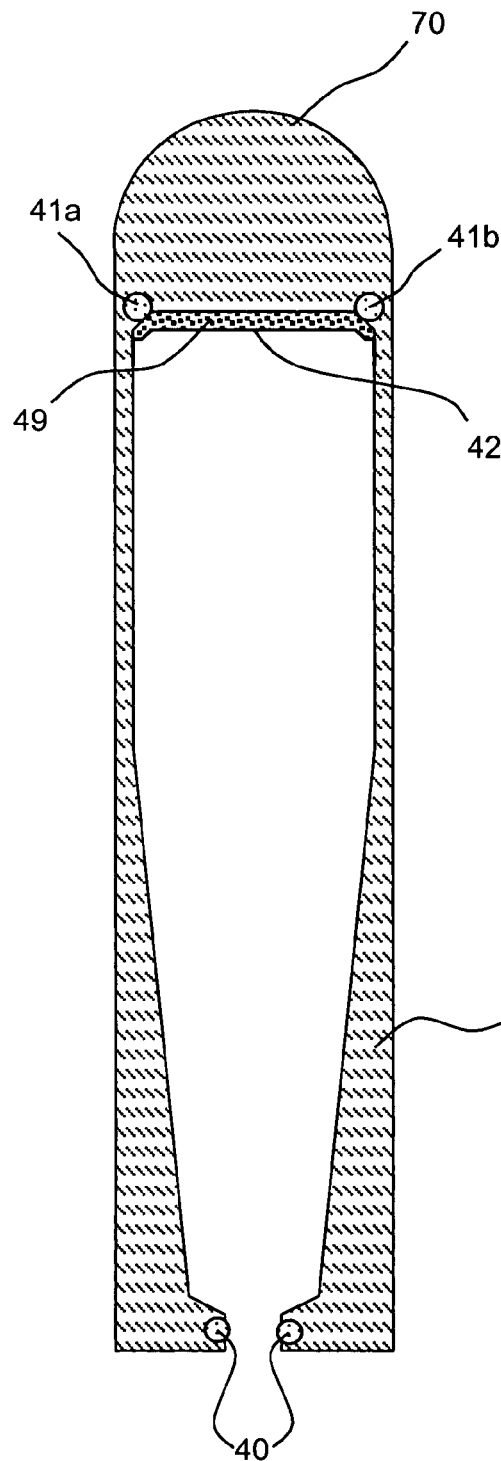
FIG. 44a shows a cross-sectional schematic of a top fiber of a FED with a lenticular lens built into the top to the fiber.
Figure 44B:
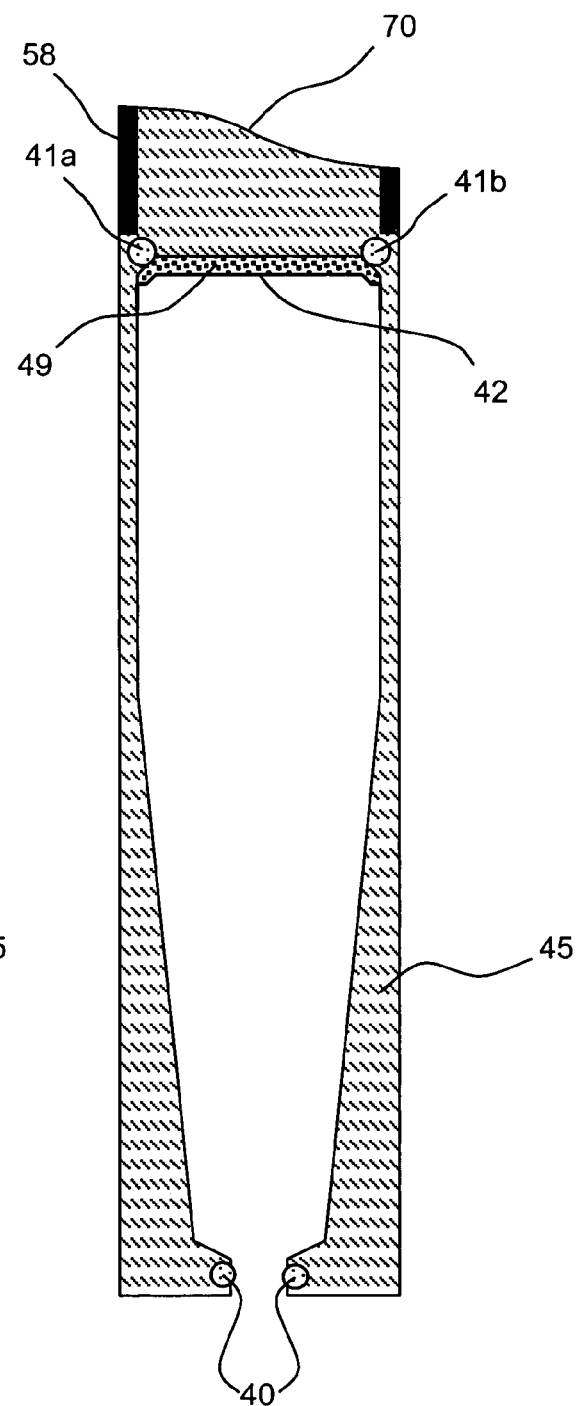
FIG. 44b shows a cross-sectional schematic of a top fiber of a FED with a lens having a continuously varying focal length used to create a three-dimensional image with varying depth.

Examples of how the technology can be used to create a three-dimensional FED display are shown in FIGS. 44a and 44b. Details on the construction of these fiber-based FED displays are disclosed in provisional patent application entitled "FIBER-BASED FIELD EMISSION DISPLAY", filed on Mar. 1, 2000, which is incorporated herein by reference. Electrons which are extracted using address electrodes 40 are accelerated toward the high voltage electrodes 41a and 41b. These high-energy electrons impinge upon the phosphor 49 and cause cathodoluminescense, which generates visible light. The light generation region will be determinate on the location of the impinging electron beam.

Varying the high voltage potential between electrodes 41a and 41b can shift the impinging location of the electron beam. The generated light can be modeled as a point light source located in the phosphor layer 49. Knowing the curvature of the lenticular lens 70 in FIG. 44a will allow for the calculation of the projection of the light out of the display. Shifting the light generation region will shift the projection of light out of the display. Multiplexing each pixel within the display will allow for the displaying of multiple images. The lens 70 in FIG. 44b has a continuously varying lens function. Therefore, depending on the location of light generation under the lens 70 will determine the focus of the light out in front of the display. Multiplexing the location of the light generation at every pixel will create an image with perceive depth.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A fiber in an electronic display, wherein said fiber comprises:
    a) at least one electrode; and
    b) a lens designed into at least a part of said fiber.
2. The fiber of claim 1, wherein said electrode is a metal wire electrode contained within or on the surface of said fiber.
3. The fiber of claim 1, wherein said lens changes a direction of the light passing through said fiber.
4. The fiber of claim 1, wherein said lens changes a focus of the light passing through said fiber.
5. The fiber of claim 1, wherein said lens is located on at least one section of at least one surface of said fiber.
6. The fiber of claim 5, wherein said lens is created by a shape of said fiber surface selected from the group consisting of:
    a) a convex shape;
    b) a concave shape; and
    c) a combination of a convex and a concave shape.
7. The fiber of claim 5, wherein said lens is selected from the group consisting of:
    a) a binary lens;
    b) a Fresnel lens; and
    c) a lenticular lens.
8. The fiber of claim 1, wherein said lens is created inside said fiber using a material to form said lens having a different index of refraction than said fiber material.
9. The fiber of claim 1, further comprising at least one absorbing region within said fiber or on said fiber surface, which creates an aperture.
10. The fiber of claim 1, further comprising at least one reflecting region within said fiber or on said fiber surface, which creates an aperture.
11. The fiber of claim 1, wherein said fiber further comprises at least one absorbing region such that said absorbing region acts as a black matrix to separate at least one part of said fiber from another part of said fiber.
12. The fiber of claim 1, wherein said fiber is composed of a material selected from the group consisting of:
    a) glass; and
    b) plastic.
13. The fiber of claim 1, wherein at least one part of said fiber is colored.
14. The fiber of claim 1, wherein said lens corrects for a chromatic aberration.
15. An electronic display comprising at least one fiber of claim 1, wherein said display is a multiple view display.
16. An electronic display comprising at least one fiber of claim 1, wherein said display is a three-dimensional display.
17. The electronic display of claim 16, wherein said three-dimensional display is a stereoscopic display.
18. The electronic display of claim 16, wherein said display is created by varying a focus of an image independently at each individual pixel.
19. The electronic display of claim 16, wherein said display is created by dynamically varying a distance of a perceived image from a viewer pixel by individual pixel.
20. A fiber for use in an electronic display, wherein said fiber comprises:
    a) at least one electrode; and
    b) an aperture in said fiber such that said aperture is formed by at least one optically absorbing or reflecting region.
21. The fiber of claim 20, wherein said electrode is a metal wire electrode contained within or on the surface of said fiber.
22. The fiber of claim 20, further comprising at least one absorbing region to further define the source of light exiting said aperture.
23. An electronic display comprising at least one fiber of claim 20, wherein said display is a multiple view display.
24. An electronic display comprising at least one fiber of claim 20, wherein said display is a three-dimensional display.
25. The electronic display of claim 24, wherein said three-dimensional display is a stereoscopic display.
26. A fiber for use in an electronic display, wherein said fiber comprises:
    a) at least one wire electrode; and
    b) at least two transparent materials such that each of said transparent materials have a different index of refraction;
    wherein said transparent materials form a lens within said fiber.
27. An electronic display comprising at least one fiber of claim 26, wherein said display is a multiple view display.
28. An electronic display comprising at least one fiber of claim 26, wherein said display is a three-dimensional display.
29. The electronic display of claim 28, wherein said three-dimensional display is a stereoscopic display.
30. The electronic display of claim 28, wherein said display is created by varying a focus of an image independently at each individual pixel.
31. The electronic display of claim 28, wherein said display is created by dynamically varying a distance of a perceived image from a viewer pixel by individual pixel.
32. The fiber of claim 26, further comprising at least two material stripes contained within said fiber wherein the composition of said material stripes alternates between high and low indices of refraction such that light passing through said material stripes is collimated.
33. A fiber for use in an electronic display, wherein said fiber comprises:
    a) at least one wire electrode; and
    b) at least two transparent materials such that each of said transparent materials have a different index of refraction;
    wherein a plurality of alternating high and low index of refraction material regions are formed within said fiber such that said regions redirect light passing through said fiber.

34. The fiber of claim 33, further comprising a waveguide wherein said waveguide is formed from said two transparent materials such that said waveguide directs light through an aperture created in said fiber.

35. A method of creating a three-dimensional image in a display having multiple electrodes and lens curvatures at each pixel that define an appearance of depth of said image at each pixel, comprising:
 a) subdividing a voltage that creates said appearance of depth in at least one pixel location between more than one of said electrodes in said at least one pixel location such that said appearance of depth is perceived by a viewer to be between either appearance of depth created by applying said voltage to any one of said electrodes individually.

36. A method of creating a three-dimensional image in claim 35, further comprising dividing the light intensity map in said at least one pixel location between more than one of said multiple electrodes to create said three-dimensional image.

37. An electronic display comprising:
 a) at least one fiber to form structure within said display; and
 b) a lens function designed into at least a part of said fiber; wherein light traveling through the lens in the fiber travels orthogonal to a long axis of said fiber.

38. The electronic display of claim 37, wherein the fiber comprises an electrode.

39. An electronic display comprising:
 a) at least one fiber to form structure within said display; and
 b) an aperture in said fiber such that said aperture is formed by at least one optically absorbing or reflecting region;
 wherein light traveling through the aperture in the fiber travels orthogonal to a long axis of said fiber.

40. The electronic display of claim 39, wherein the fiber comprises an electrode.

41. An electronic display comprising:
 a) at least one fiber to form structure within the display comprising a wire electrode to carry a majority of a current along a length of the fiber; and
 b) a transparent electrode connected to the wire electrode to spread a charge from the wire electrode across at least a portion of a surface of the fiber.

42. The electronic display of claim 41 where in the fiber is composed of a material selected from the group consisting of glass and polymer.

* * * * *